United States Patent
Hiel et al.

(10) Patent No.: US 9,093,191 B2
(45) Date of Patent: *Jul. 28, 2015

(54) FIBER REINFORCED COMPOSITE CORE FOR AN ALUMINUM CONDUCTOR CABLE

(75) Inventors: Clement Hiel, Rancho Palos Verdes, CA (US); George Korzeniowski, Woodland Hills, CA (US)

(73) Assignee: CTC Global Corp., Irvine, CA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 12/074,996

(22) Filed: Mar. 6, 2008

(65) Prior Publication Data

US 2008/0233380 A1 Sep. 25, 2008

Related U.S. Application Data

(63) Continuation-in-part of application No. 10/511,881, filed as application No. PCT/US03/12520 on Apr. 23, 2003, now Pat. No. 7,368,162.

(60) Provisional application No. 60/374,879, filed on Apr. 23, 2002.

(51) Int. Cl.
  *B32B 27/04* (2006.01)
  *H02G 3/00* (2006.01)
  (Continued)

(52) U.S. Cl.
  CPC .............. *H01B 5/105* (2013.01); *B32B 15/04* (2013.01); *B32B 27/04* (2013.01); *H01B 7/1825* (2013.01);
  (Continued)

(58) Field of Classification Search
  CPC ................... Y10T 428/2913; Y10T 428/2929; Y10T 428/2933; Y10T 428/2938; Y10T 428/294; Y10T 428/2942; Y10T 428/2947

USPC .......... 428/300.7, 397.4, 299.4, 299.1, 298.1, 428/300.4, 301.4; 174/70 R, 102 R, 106 R, 174/113 C

See application file for complete search history.

(56) References Cited

U.S. PATENT DOCUMENTS 2,589,507 A  3/1952  Noyes
2,625,498 A  1/1953  Koch
(Continued)

FOREIGN PATENT DOCUMENTS

EP  0189846 A2  8/1986
EP  0346499     12/1989
(Continued)

OTHER PUBLICATIONS

Zoltex, PANAX 33 MSDS, undated.*
(Continued)

*Primary Examiner* — Jill Gray
(74) *Attorney, Agent, or Firm* — Marsh Fischmann & Breyfogle LLP

(57) ABSTRACT

A composite core for an electrical cable, the composite core defining a longitudinal axis that defines a center of the composite core, the core comprising a plurality of longitudinally extending reinforcing fibers embedded in a resin matrix, the fibers oriented substantially parallel to the longitudinal axis and a non-conductive insulating layer surrounding the plurality of longitudinally oriented fibers. The insulating layer may further comprise a plurality of glass fibers. The insulating layer may also comprise a type of resin, including for example, thermosetting resin or thermoplastic resin.

43 Claims, 12 Drawing Sheets

(51) Int. Cl.

| | | |
|---|---|---|
| *H01B 5/10* | (2006.01) | |
| *B32B 15/04* | (2006.01) | |
| *H01B 7/18* | (2006.01) | |
| *H01B 9/00* | (2006.01) | |
| *H02G 7/04* | (2006.01) | |
| *H02G 7/05* | (2006.01) | |
| *H02G 15/06* | (2006.01) | |
| *H02G 15/18* | (2006.01) | |
| *H01B 13/00* | (2006.01) | |

(52) U.S. Cl.
CPC ............... *H01B 9/006* (2013.01); *H02G 7/04* (2013.01); *H02G 7/056* (2013.01); *H02G 15/06* (2013.01); *H02G 15/18* (2013.01); *H01B 13/0016* (2013.01); *Y10T 428/294* (2015.01); *Y10T 428/2933* (2015.01); *Y10T 428/2938* (2015.01)

(56) References Cited

U.S. PATENT DOCUMENTS

| | | |
|---|---|---|
| 3,331,919 A | 7/1967 | Vayson |
| 3,599,679 A | 8/1971 | Carter |
| 3,692,924 A | 9/1972 | Nye |
| 3,717,720 A * | 2/1973 | Snellman ............... 174/131 A |
| 3,808,078 A | 4/1974 | Snellman et al. |
| 3,973,385 A | 8/1976 | Roe |
| 4,059,951 A | 11/1977 | Roe |
| 4,097,686 A | 6/1978 | Gladenbeck et al. |
| 4,127,741 A | 11/1978 | Bauer et al. |
| 4,195,141 A * | 3/1980 | Buning et al. ............ 525/326.5 |
| 4,247,436 A | 1/1981 | Buning et al. |
| 4,422,718 A | 12/1983 | Nakagome et al. |
| 4,441,787 A | 4/1984 | Lichtenberger |
| 4,515,435 A | 5/1985 | Anderson |
| 4,620,401 A | 11/1986 | L'Esperance et al. |
| RE32,374 E | 3/1987 | Dey et al. |
| 4,690,497 A | 9/1987 | Occhini et al. |
| 4,763,981 A | 8/1988 | Wilkins |
| 4,793,685 A | 12/1988 | Taylor et al. |
| 4,961,990 A | 10/1990 | Yamada et al. |
| 4,966,434 A | 10/1990 | Yonechi et al. |
| 5,068,142 A | 11/1991 | Nose et al. |
| 5,082,397 A | 1/1992 | Raviv |
| 5,093,162 A | 3/1992 | Fenton et al. |
| 5,122,622 A | 6/1992 | Reuss et al. |
| 5,198,173 A | 3/1993 | Terzian et al. |
| 5,198,621 A | 3/1993 | Kojima |
| 5,222,173 A | 6/1993 | Bausch |
| RE34,516 E | 1/1994 | Houghton |
| 5,296,456 A | 3/1994 | Shiga et al. |
| 5,304,619 A | 4/1994 | Yokoyama et al. |
| 5,360,497 A | 11/1994 | Schneider et al. |
| 5,437,899 A | 8/1995 | Quigley |
| 5,451,355 A | 9/1995 | Boissonnat et al. |
| 5,540,870 A * | 7/1996 | Quigley ................ 264/103 |
| 5,561,729 A | 10/1996 | Parris |
| 5,626,700 A | 5/1997 | Kaiser |
| 5,651,081 A | 7/1997 | Blew et al. |
| 5,725,954 A * | 3/1998 | Montsinger ............ 428/397 |
| 5,734,770 A | 3/1998 | Carpenter et al. |
| 5,808,239 A | 9/1998 | Olsson |
| 5,847,324 A | 12/1998 | Farquhar et al. |
| 5,917,977 A | 6/1999 | Barrett |
| 6,007,655 A | 12/1999 | Gorthala et al. |
| 6,015,953 A | 1/2000 | Tosaka et al. |
| 6,070,378 A | 6/2000 | Dumlao et al. |
| 6,148,866 A | 11/2000 | Quigley et al. |
| 6,180,232 B1 | 1/2001 | McCullough et al. |
| 6,245,425 B1 | 6/2001 | McCullough et al. |
| 6,270,856 B1 | 8/2001 | Hendewerk et al. |
| 6,329,056 B1 | 12/2001 | Deve et al. |
| 6,343,172 B1 | 1/2002 | Schiestl et al. |
| 6,344,270 B1 | 2/2002 | McCullough et al. |
| 6,363,192 B1 | 3/2002 | Spooner |
| 6,423,808 B1 | 7/2002 | Watanabe et al. |
| 6,447,927 B1 | 9/2002 | McCullough et al. |
| 6,463,198 B1 | 10/2002 | Coleman et al. |
| 6,528,729 B1 | 3/2003 | Kamata |
| 6,568,072 B2 | 5/2003 | Wilemon et al. |
| 6,800,164 B2 | 10/2004 | Brandstrom |
| 6,861,131 B2 | 3/2005 | Evans |
| 7,015,395 B2 | 3/2006 | Goldsworthy et al. |
| 7,060,326 B2 * | 6/2006 | Hiel et al. ............... 427/384 |
| 7,179,522 B2 * | 2/2007 | Hiel et al. ............... 428/300.7 |
| 7,211,319 B2 * | 5/2007 | Hiel et al ............... 428/300.7 |
| 7,368,162 B2 * | 5/2008 | Hiel et al. ............... 428/300.7 |
| 7,438,971 B2 * | 10/2008 | Bryant et al. ............ 428/300.7 |
| 2002/0056508 A1 | 5/2002 | Brandstrom |
| 2002/0088549 A1 | 7/2002 | Fanucci et al. |
| 2002/0176979 A1 | 11/2002 | Evans |
| 2002/0189845 A1 | 12/2002 | Gorrell |
| 2004/0009338 A1 * | 1/2004 | Jo et al. ............... 428/297.4 |
| 2004/0026112 A1 | 2/2004 | Goldsworthy et al. |
| 2004/0132366 A1 | 7/2004 | Hiel et al. |
| 2004/0182597 A1 | 9/2004 | Smith et al. |
| 2004/0235592 A1 | 11/2004 | McGrath et al. |
| 2005/0048273 A1 | 3/2005 | Ryan |
| 2005/0051580 A1 | 3/2005 | Ramey |
| 2005/0186410 A1 | 8/2005 | Bryant et al. |
| 2006/0016616 A1 | 1/2006 | Goldsworthy et al. |
| 2007/0128435 A1 | 6/2007 | Hiel et al. |
| 2008/0233380 A1 * | 9/2008 | Hiel et al. ............... 428/299.4 |
| 2010/0163275 A1 * | 7/2010 | Hiel et al. ............... 174/124 R |
| 2010/0181012 A1 * | 7/2010 | Hiel et al. ............... 156/180 |

FOREIGN PATENT DOCUMENTS

| | | | |
|---|---|---|---|
| EP | 0550784 A1 | 7/1993 | |
| EP | 0814355 A1 | 12/1997 | |
| EP | 1124235 | 8/2001 | |
| EP | 1168374 | 1/2002 | |
| JP | 03-129606 A | 6/1991 | |
| JP | 06-007112 | 1/1994 | |
| JP | 11-263888 A | 9/1999 | |
| JP | 2000-27082 | 1/2000 | |
| RU | 1817167 A1 | 5/1993 | |
| RU | 2210797 C2 | 8/2003 | |
| WO | 9534838 A1 | 12/1995 | |
| WO | 0206549 A1 | 1/2002 | |
| WO | 0206550 A1 | 1/2002 | |
| WO | 0207170 A1 | 1/2002 | |
| WO | 03050825 A1 | 6/2003 | |
| WO | WO 03/050825 | 6/2003 | |
| WO | 03091008 A1 | 11/2003 | |
| WO | WO 03091008 A1 * | 11/2003 | ............ B29D 22/00 |
| WO | 2005040017 A2 | 5/2005 | |

OTHER PUBLICATIONS

Sucuma P. Elliot, "HECO Puts New Composite Conductors to the Test", Transmission and Distribution World, Jun. 1, 2003.

Clem Heil, "Development of a Composite Reinforced Aluminum Conductor", California Energy Commission Consultant Report (Nov. 2000).

James G. Vaughan et al., Characterization of Mechanical and Thermal Properties of Advanced Composite Pultrusions, D Electric Power Research Institute, Technical Report-106271 (Aug. 1995).

Sujit S. Kumar, Characterization of Dynamic Mechanical Properties of Pultruded Hybrid Cylindrical Composite Rods in D Torsional and Flexural Modes of Vibration, Thesis (University of Mississippi May 1994).

Kumar N.S.V. Papineni, Study of Static Mechanical Properties of Pultruded Hybrid Graphite/Glass-Epoxy Composites, D Thesis (University of Mississippi Dec. 1994).

L.R. Gambone, Alternative Materials for Overhead Conductors, Canadian Electrical Association, ST-318, (Dec. 1991).

G. Newaz et al., Structural Composite Cores for Overhead Power Transmission Conductors, Electric Power Research D Institute, EM-511 0 (Apr. 1987).

(56) References Cited

OTHER PUBLICATIONS

K.E. Hofer, Jr. et al., Degradation and Enhancement of the Fatigue Behavior of Glass/Graphite//Epoxy Hybrid D Composites, vol. 18, No. 2, Polymer Engineering Science, pp. 120-129, Mid-Feb. 1978.
Nagaraja Rao & K.E. Hofer, Jr., Fatigue Behavior of Graphite/Glass/Epoxy Composites, Apr. 1973.
Reexamination Request in Reexamination Control No. 90/011,740 for US Patent No. 7,368,162, filed Jun. 16, 2011.
Notice Granting Reexamination in Reexamination Control No. 90/011,740 for US Patent No. 7,368,162, mailed Jul. 21, 2011.
Office Action in Reexamination Control No. 90/011,740 for US Patent No. 7,368,162, mailed Nov. 2, 2011.
Ex parte Reexamination Interview Summary in Reexamination Control No. 90/011,740 for US Patent No. 7,368,162, mailed Dec. 13, 2011.
Response to Office Action in Reexamination Control No. 90/011,740 for US Patent No. 7,368,162, filed Jan. 3, 2012.
Declaration of Bruce Bernstein in Reexamination Control No. 90/011,740 for US Patent No. 7,368,162, filed Jan. 3, 2012.
Declaration of Jerome Fanucci in Reexamination Control No. 90/011,740 for US Patent No. 7,368,162, filed Jan. 3, 2012.
Declaration of Clement Hiel in Reexamination Control No. 90/011,740 for US Patent No. 7,368,162, filed Jan. 3, 2012.
Declaration of Jason Huang in Reexamination Control No. 90/011,740 for US Patent No. 7,368,162, filed Jan. 3, 2012.
Declaration of James Senger in Reexamination Control No. 90/011,740 for US Patent No. 7,368,162, filed Jan. 3, 2012.
Declaration of Marvin Sepe in Reexamination Control No. 90/011,740 for US Patent No. 7,368,162, filed Jan. 3, 2012.
Notice of Intent to Issue Reexamination Certificate in Reexamination Control No. 90/011,740 for US Patent No. 7,368,162, mailed Feb. 13, 2012.
Reexamination Certificate in Reexamination Control No. 90/011,740 for US Patent No. 7,368,162, issued May 8, 2012.
International Searching Authority, International Preliminary Examination Report, PCT/US03/12520, Feb. 4. 2008.
International Search Report and Written Opinion, PCT/US04/35201, Jul. 14, 2005.
Office of Industrial Technologies, "Development of a Composite-Reinforced Aluminum Conductor", Dec. 2001.
Oak Ridge National Laboratory, "Power Grid of the Future", ONRL Review, vol. 35, No. 2, 2002, web-print.
Alcoa Conductor Products Company, T&D Conductors; Overhead; Underground; Building Wire:, Jul. 1, 1989, p. 33.
Agy, "Advanced Materials Solutions for Demanding Applications", Pub. No. LIT-2004-341 (Mar. 2004), www.agy.com web print.
Agy, "Glassfiber Reference Guide", 1999, Pub. No. LIT-99021 (Jul. 1999), www.agy.com web print.
Nod et al., "Experimental and Finite Element Analysis of P)ultruded Glass-Graphite/Epoxy Hybrids in Axial and Flexural Modes of Vibration," J. Compoiste Materials, vol. 30, No. 18 (1996).
HexTow AS4 Carbon Fiber Product Data, Hexcel Corp. (2014).
Wallenberger et al., "Glass Fibers," ASM Handbook, vol. 21: Composites (2001).
"The Mechanical Properties of CF/GF/Epoxy Composites," Shigui et al., Engineering Plastic Applications, 1999, pp. 10-11.

\* cited by examiner

FIBER REINFORCED COMPOSITE CORE FOR AN ALUMINUM CONDUCTOR CABLE

CROSS REFERENCE TO RELATED APPLICATIONS

This application is a continuation in part of U.S. patent application Ser. No. 10/511,881, filed Oct. 19, 2004 now U.S. Pat. No. 7,368,162, entitled "ALUMINUM CONDUCTOR COMPOSITE CORE REINFORCED CABLE AND METHOD OF MANUFACTURE" which is a United States 371 application of PCT/US03/12520, filed Apr. 23, 2003, which claims the benefit of U.S. Provisional Application No. 60/374,879, filed Apr. 23, 2002, the disclosures of which are hereby incorporated by reference in their entirety. In relation to this Application, applicants claim priority of earlier U.S. provisional application Ser. No. 60/374,879 filed in the United States Patent and Trademark Office on Apr. 23, 2002, the entire disclosure of which is incorporated by reference herein.

FIELD OF THE INVENTION

The present invention relates to an aluminum conductor composite core (ACCC) reinforced cable and method of manufacture. More particularly, to a cable for providing electrical power having a reinforced fiber thermosetting resin composite core surrounded by aluminum conductor capable of carrying increased ampacity at elevated temperatures.

BACKGROUND OF INVENTION

Electrical power transmission and distribution cables are designed having a load bearing member to support aluminum for electricity conduction. For example, traditional aluminum conductor steel reinforced cables (ACSR) are designed having aluminum conductor to transmit the power wrapped around a steel core that is designed to carry the transfer load. Typical ACSR cables can be operated at temperatures up to 100° C. on a continuous basis without any significant change in the conductor's physical properties related to a reduction in tensile strength. The inherent physical characteristics of the components of these traditional cables limit ampacity.

It is known that ampacity gains can be obtained by increasing the conductor area that wraps the core of the transmission cable. However, increasing conductor weight causes numerous problems. Weight increases due to increased conductor area cause the cable to sag. In addition, large load increases relate to increased tension placed on the cable infrastructure which, depending on the load, may require structure reinforcement or replacement, wherein such infrastructure modifications are typically not financially feasible. Thus, there is financial motivation to increase the load capacity on electrical transmission cables while using the existing infrastructure.

Thus, there is a need to design electricity transmission and distribution cables that can handle increased ampacity without the corresponding sag and weight limitations of the current cables.

SUMMARY OF THE INVENTION

In light of the above and according to one broad aspect of an embodiment of the present invention, a composite core for an electrical cable is disclosed herein. In one example, the composite core defines a longitudinal axis that defines a center of the composite core. The core comprises a plurality of longitudinally extending reinforcing fibers embedded in a resin matrix, the fibers comprising a tensile strength in excess of glass fibers, the fibers positioned towards the center of the composite core and the fibers oriented substantially parallel to the longitudinal axis. A plurality of off-axis reinforcing fibers are embedded in a resin matrix and surround the longitudinally extending fibers. The off-axis fibers are oriented at an angle relative to the longitudinal axis.

Further disclosed is another embodiment of a composite core for an electrical cable. In one example, the composite core defines a longitudinal axis that defines a center of the composite core. The composite core comprises a plurality of reinforcing fibers of one or more fiber types embedded in a resin matrix, the one or more reinforcing fiber types having a substantially parallel orientation with respect to the longitudinal axis; and a sheath surrounding the plurality of one or more reinforcing fiber types. In various embodiments, the sheath may or may not be reinforced with fibers, including for example, off-axis fibers.

An alternate embodiment of a composite core for an electrical cable is disclosed herein. For example, a composite core defining a longitudinal axis that defines a center of the composite core. The core comprises a plurality of reinforcing carbon fibers embedded in a resin matrix, the carbon fibers positioned towards the center of the composite core and the carbon fibers having a substantially parallel orientation with respect to the longitudinal axis. The carbon fibers may be surrounded by a plurality of reinforcing glass fibers embedded in a resin matrix, the glass fibers oriented at an off-axis angle relative to the longitudinal axis.

In accordance with another broad aspect of an embodiment of the invention, a composite core comprising a center region, an interface region and an outer region is disclosed. For example, a composite core for an electrical cable is disclosed herein, the composite core defining a longitudinal axis that defines a center of the composite core. In one embodiment, the core comprises a central region, comprising a plurality of longitudinally extending reinforcing fibers of at least a first fiber type embedded in a resin matrix. The fibers, comprising a tensile strength in excess of glass fibers, are arranged towards the center of the core and are oriented substantially parallel to the longitudinal axis. The core further comprises an interface transition region between the central region and an outer region of the core. The fibers of the interface transition region oriented substantially parallel to the longitudinal axis and arranged having a random mixture of fibers from the central region and the outer region. The resin bonds fibers of the central region with fibers of the outer region to create a transition between fiber types. The core further comprises an outer region, the outer region comprising a plurality of longitudinally extending reinforcing fibers of at least a second fiber type embedded in a resin matrix, the fibers comprising a tensile strength of or similar to glass fibers, the fibers oriented substantially parallel to the longitudinal axis, the fibers arranged surrounding the center region and the interface region.

BRIEF DESCRIPTION OF THE DRAWINGS

These and other features of the invention are best understood by referring to the detailed description of the invention, read in light of the accompanying drawings, in which.

DEFINITIONS

Figure 1:
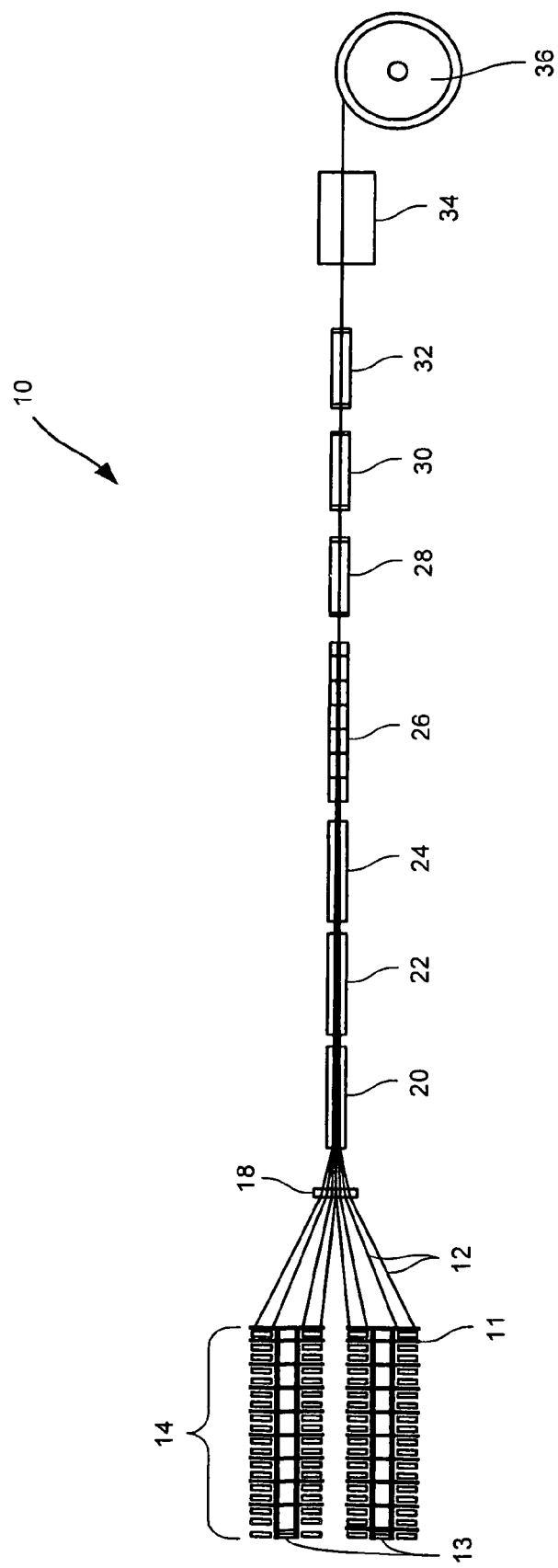
FIG. 1 is a schematic diagram of a B-stage forming process used for forming reinforced fiber composite core members in accordance with the present invention.

Within the context of this specification, each term or phrase below will include the following meaning or meanings.

"ACCC" refers to aluminum conductor composite core.

"Bonded" or "bond" or "bonding" refers to the joining, adhering, connecting, attaching, or the like, of at least two elements. Two elements will be considered to be bonded together when they are bonded directly to one another or indirectly to one another, such as when each is directly bonded to intermediate elements.

"Coefficient of Thermal Expansion" or "CTE" refers to the change in length per unit length of material for a one degree Centigrade change in temperature. The magnitude of the CTE depends on the structure of the material.

"Cross-linking" refers to the chemical bonding of molecules which in polymers occurs in the curing transition from a liquid to a solid.

"Cure" refers to the completion of the cross-linking process during which a composite develops its full strength.

"Cure Temperature" refers to the temperature at which the composite core is subjected to curing.

"Dry Spot" means an area of incomplete wetting of fibers.

"Epoxy Plastics" refers to plastics based on resins made by the reaction of epoxides or oxiranes with other materials such as amines, alcohols, phenols, carboxylic acids, acid anhydrides and unsaturated compounds.

"Epoxy Resin" refers to polymer resin characterized by epoxide molecule groups.

"Fiber" or "Filament" refers to reinforcement material which is a major component in the composite, typically microns in diameter.

"Fiber Diameter" refers to the diameter of individual filaments.

"Fiberglass" refers to continuous strands of glass fibers that have been extruded into fine filaments. These filaments vary in diameter, and are measured in microns. Glass filaments are treated with special binders and processed similar to textile fibers.

"Fiber Orientation" refers to alignment of the fibers within the composite with respect to the longitudinal axis.

"Filler" refers to usually inert organic or inorganic materials which are added to plastics, resins or gel coats to vary the properties, extend volume, or lower the cost of the article being produced.

"Flexural Strength" or "modulus of rupture" or "bend strength" or "fracture strength" refers to a measure of the strength of a material in bending. Flexural strength is measured in terms of stress, and thus is expressed in pascals (Pa) in the SI system.

"Impregnate" means to substantially saturate the fibers with resin.

"Interlaminar Shear Strength" refers to the maximum shear stress existing between layers of a laminated material.

"Modulus of Elasticity" for a material refers to a measure of how much the material will yield when subjected to a given force per unit area, i.e., the amount the material yields (elongation per unit length) is called strain, and the force per unit area is called stress. Modulus of elasticity may be expressed in force per unit area, usually pounds per square inch or kilograms-force per square centimeter. The relationship is found as the slope of a stress-strain curve from initial loading to the proportional limit. A higher value of the modulus indicates a more brittle material or less elastic material (such as carbon fibers) and a lower value indicates a more ductile material or more elastic (such as glass fibers).

"Pultrusion" refers to a continuous molding process where resin-impregnated fibers are pulled through a heated curing die to create the composite core.

"Residual Stress" refers to a tension or compression which exists in the composite without application of an external load after the molding process.

"Roving" means a collection of bundles of continuous filaments or fibers in untwisted strands.

"Sizing" refers to agents added to the fibers to improve handling, reduce moisture absorption and/or promote resin wetting of the fiber.

"Tow" refers to an untwisted bundle comprising a large plurality of fibers.

"Tensile Modulus" or "tensile strength" refers to the point at which a material will fail when under a tensile load (being pulled from each end of the material). Tensile strength can be measured in units of force divided by units of area, usually $N/cm^2$; megapascals (MPa) or gigapascals (GPa) or pounds per square inch (psi).

"Thermoplastics" refers to a group of plastic materials that become elastic or melt when heated to a range of high temperatures, and return to their rigid state at cooler temperatures. Examples are Polyvinyl Chloride—PVC, Acrylonitrile Butadiene Styrene—ABS, polystyrene, polycarbonates, nylon, etc.

"Thermosets" refers to materials that undergo a chemical crosslinking reaction going from liquid to solid or semi-solid. This reaction is irreversible. Typical thermosets are polyesters, acrylics, epoxies, and phenolics.

"Unidirectional" refers to a composite having fiber orientation in substantially one direction.

These terms may be defined with additional language in the remaining portions of the specification.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

In various embodiments described herein, a reinforced composite core member comprises a plurality of reinforcing fibers embedded in a resin for use as the load bearing member in electrical power distribution cables. Aluminum conductor composite core reinforced (ACCC) cables may provide for electrical power distribution. As used herein, electrical power distribution refers to both distribution and transmission.

Conductor cables are constrained by the inherent physical characteristics of the components that limit ampacity. Ampacity is a measure of the ability to send power through the cable. Increased power causes an increase in the conductor's operating temperature. Excessive heat causes the cable to sag below permissible levels. Therefore, to increase the load carrying capacity of transmission cables, the cable itself must be designed using components having inherent properties that withstand increased ampacity without inducing excessive sag.

In an ACCC cable, the steel core of the ACSR cable is replaced by a composite core comprising at least one reinforcing fiber type in a resin matrix. Replacing the steel core has many advantages. The composite core member offers substantial improvements in strength to weight ratio over conventional materials, such as traditional steel non-composites. An ACCC cable can maintain operating temperatures in the range of about −40 to about 240° C. without the corresponding sag induced in traditional ACSR cables. In various embodiments, the ACCC cable couples a higher modulus of elasticity with a lower coefficient of thermal expansion to achieve higher ampacity. An ACCC cable can achieve increased ampacity over other conductor cables by about 0 to about 200%. The increase in ampacity, as well as a reduction in line losses, is further supplemented and achieved through the utilization of additional conductive material (such as aluminum, copper, or other alloy) that is wrapped around the lighter weight core so the finished conductor contains more conductive material without a weight penalty.

Figure 11:
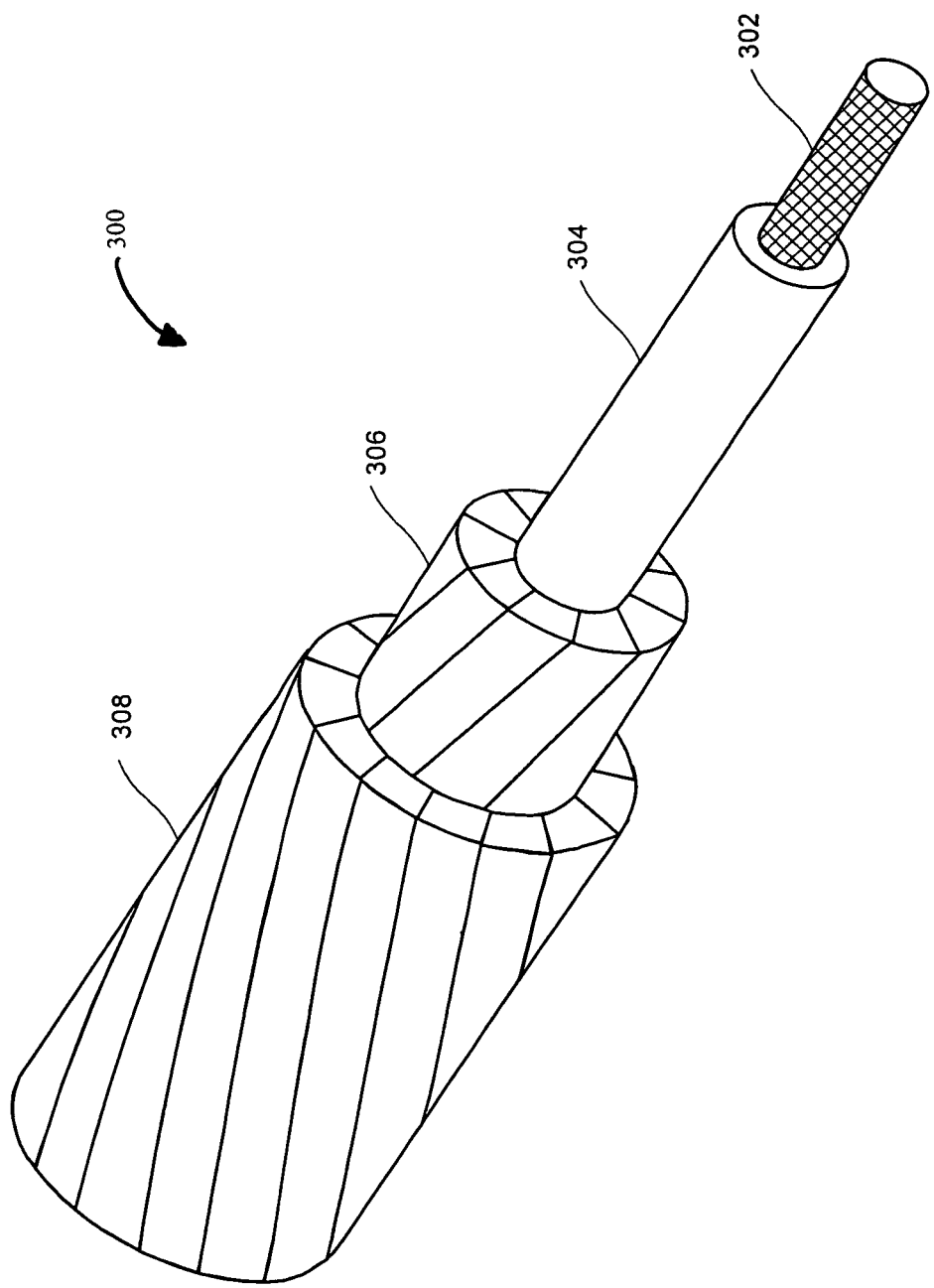
FIG. 11 is a schematic view of one embodiment of an aluminum conductor composite core (ACCC) reinforced cable, the core comprising a resin matrix embedding a plurality of carbon fibers oriented towards the center of the core, the carbon fibers surrounded by a plurality of glass fibers. The glass fibers of the composite core are surrounded by two layers of aluminum conductor.

In one embodiment, for example, a plurality of fibers are embedded in a resin to form the composite core member. FIG. 11 illustrates a typical embodiment of an ACCC reinforced cable 300. FIG. 11 illustrates an ACCC reinforced cable having a reinforced carbon fiber/epoxy resin composite section or inner core or central region 302 arranged about the center of the core. The inner core is surrounded by a reinforced glass fiber/epoxy resin composite section or outer core or outer region 304 defining an outer circumference of the composite core. The outer circumference of the core is surrounded by a first layer of a plurality of trapezoidal shaped aluminum conductor 306 and a second layer 308 of a plurality of trapezoidal shaped aluminum strands wrap around the first aluminum layer 306. As used herein, inner core refers to the fibers arranged towards the center of the core and the outer core refers to fibers that surround the fibers towards the center of the core thereby defining the outer circumference of the core.

Figure 12:
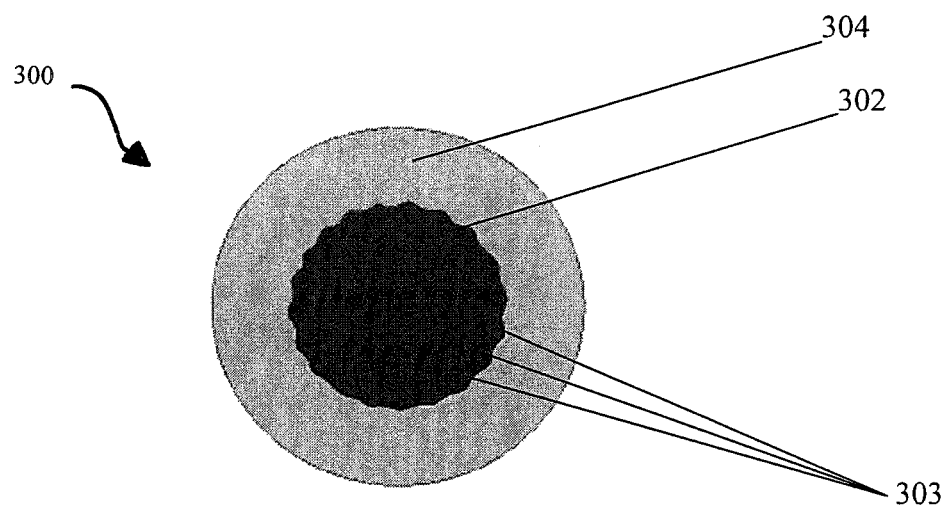
FIG. 12 is a schematic view of one embodiment of an aluminum conductor composite core (ACCC) reinforced cable, the core comprising a resin matrix embedding a plurality of carbon fibers oriented towards the center of the core, the carbon fibers surrounded by a plurality of glass fibers to created a rough interface between the layers of the core. The glass fibers of the composite core are surrounded by two layers of aluminum conductor.

In a typical embodiment, as illustrated in FIG. 12, the boundary between the inner and the outer core is not a uniform transition. For example, the boundary may define a rough, random or uneven boundary between the inner core or central region 302 and outer core or outer region 304. In one example, the interface region 303 comprises a generally random transition or transitional mixture of fibers from the central region carbon fibers to the outer region glass fibers that surround the central region carbon fibers. Thus, in the interface region the fibers of the central region and the fibers of the outer region are intermixed and bonding occurs between the at least two different fiber types. That is, according to one example as illustrated in FIG. 12, carbon fibers and glass fibers are intermixed and bonded with each other within the interface region to create a more gradual transition between the center region and the outer region. It should be recognized that although the example refers to glass and carbon fibers, the interface region applies to any composite core having two or more fiber types.

Alternatively, the shape of the inner arrangement of carbon fibers may be varied to increase flexibility by varying the cross section of the composite core. For example, the carbon fibers may be arranged having an oval, elliptical, or eye shape configuration (not shown).

In a typical embodiment, the composite core comprises an elongated strength member defining a longitudinal axis in one dimension and a generally circular outer circumference in another dimension. The longitudinal axis further defines a center of the core. The strength member comprises a resin or matrix material that embeds a plurality of strengthening fibers. More particularly, the resin or matrix embeds the fibers to form a strength member, or load bearing member which is the composite core. The resin or matrix material is the material that holds or bonds the fibers of the core together. In general, the resin functions as a bonding agent to securely bind substantially all of the fibers in the core. The matrix assists the fibers to act as a single unit to withstand the physical forces on the ACCC cable. The fibers can be referred to as reinforcing materials, reinforcing fibers, or fibers.

Composite cores of the present invention may comprise one or more of the following characteristics: at least one type of reinforcing fiber, variable relative amounts of each reinforcing fiber type, reinforcing fiber types of substantially small diameter, reinforcing fiber types of a substantially continuous length, composite cores having a high packing density, reinforcing fiber tows having relative spacing within the packing density, a volume fraction of at least 50%, a fiber weight fraction between about 60 and about 83%, an adjustable volume fraction, a substantially low thermal expansion coefficient, a substantially high tensile strength, an ability to withstand an expansive range of operating temperatures, an ability to withstand substantially low ambient temperature, variable resin properties, variable fiber arrangement within the core, variable grades of fibers within the core, substantially high dielectric properties, having the potential of a plurality of geometric cross section configurations, and sufficient flexibility to permit winding of continuous lengths of composite core.

In accordance with various embodiment, ampacity can be increased over a traditional conductor by using a composite core having tensile strength in the range of about 160 to about 630 Ksi, a modulus of elasticity in the range of about 7 to about 30 Msi, an operating temperature in the range of about −40 to about 240° C. and a thermal expansion coefficient in the range of about 0 to about $6 \times 10^{-6}$ m/m/° C., such as in the range of about 0 to about $1.6 \times 10^{-6}$ m/m/° C. The composite core referred to herein is designed to achieve this set of physical characteristics. To achieve these physical characteristics, composite cores of the present invention can comprise one or more types of reinforcing fibers selected according to inherent physical properties or by varying the combinations of fiber types. In addition, as discussed further below, the core properties can be manipulated by changing the resin properties, combining resin types within the core, by varying the fiber to resin fraction or by combining varying fiber orientations, or a combination thereof.

Fiber Types

Depending on the inherent characteristics of the components, the composite core may be designed using one fiber type, the fiber type and resin selected in order to meet the desired physical properties of the composite core. For instance, the composite core may comprise carbon fibers embedded in resin. The core may also comprise glass fibers embedded in a polymer, or basalt fibers embedded in a resin. In addition, combining two or more types of reinforcing fibers into the composite core member offers substantial improvements in strength to weight ratio over materials commonly used for cable in an electrical power transmission system.

Fibers may be selected from synthetic or natural fibers. It is noted that these are only examples of fibers that may meet the specified characteristics of the invention, such that the invention is not limited to these fibers only. Other fibers meeting the required physical characteristics of the invention may be used.

For example, fiber types may be selected from: carbon (graphite) fibers—both HM and HS (pitch or PAN or other precursor based), KEVLAR™ fibers, basalt fibers, glass fibers, Aramid fibers, boron fibers, liquid crystal fibers, high performance polyethylene fibers, or carbon nanofibers, steel hardwire filaments, steel wires, steel fibers, high carbon steel cord with or without adhesion optimized coatings, or nanotubes. Several types of carbon, boron, KEVLAR™ and glass fibers are commercially available.

Each fiber type may have subtypes that can be variously combined to achieve a composite with certain characteristics. For instance, carbon fibers may be any type from the ZOLTEK PANEX™, ZOLTEK PYRON™, HEXCEL™, TORAY™, Grafil, or THORNEL™ families of products. Carbon fibers may come from a Polyacrylonitrile (PAN) Carbon Fiber or a PAN Precursor. Other carbon fibers would include, PAN-IM, PAN-HM, PAN-UHM, PITCH, or rayon byproducts, among others. There are dozens of different types of carbon fibers, and one skilled in the art would recognize the numerous carbon fibers that may be used in the present invention. For example, Toray T700 SC-24K, Toray T700SC-12K, Grafil TRH50-18M, Toray T800H-12K, Toray T1000G, and PyroFil TR-50S.

There are also numerous different types of glass fibers. For instance, an A-Glass, B-Glass, C-Glass, D-Glass, E-Glass, S-Glass, AR-Glass, R-Glass, or basalt fibers may be used in the present invention. Fiberglass and paraglass may also be used. For example, S-2 Glass 758-AB-225, S-2 Glass 758-AB-675; E-glass 366-AC-250; E-glass 366-AB-450, E-glass 366-AB-675, and Basalt containing E-glass.

In various embodiments, the core comprises two fiber types. The two fiber types may be within one fiber class or fiber family. For instance, the core may be formed from E-glass and S-glass, which are two fiber types or fiber subtypes within the glass fiber family or fiber class. In another embodiment, the composite core may comprise two types of carbon fibers. For instance, the composite may be formed from IM6 carbon fiber and IM7 carbon fiber. This type of combination may be used for example, to combine a more inexpensive fiber with a more expensive fiber to achieve the desired results. One skilled in the art will recognize other embodiments that would use two or more types of fibers.

Alternatively, the fiber types may be selected from a different class or family of fibers. For example, glass and carbon. In addition, each class of fibers may further comprise fibers selected from within the class of fibers, as discussed in the preceding paragraph. Combining fiber types also may allow the composite core to achieve sufficient stiffness and strength while maintaining some flexibility.

Typically, composite cores of the present invention comprise fiber tows having relatively small yield or K numbers. A fiber tow is an untwisted bundle of continuous microfibers wherein the composition of the tow is indicated by its yield or K number. For example, 12K tow has 12,000 individual microfibers. Ideally, microfibers wet out with resin such that the resin substantially coats the circumference of each microfiber within the bundle or tow. Wetting may be affected by tow size, that is, the number of microfibers in the bundle, and individual microfiber size. By definition, larger tows have a larger number of individual microfibers. Larger tows create more difficulty wetting around individual fibers in the bundle due to the number of fibers contained within the bundle. Wetting and infiltration of the fiber tows in composite materials is of critical importance to performance of the resulting composite. Incomplete wetting results in flaws or dry spots within the fiber composite reducing strength and durability of the composite product. Voids or air bubbles introduced into the composite core can further have a detrimental impact on the core properties. Fiber tows may also be selected in accordance with the size of fiber tow that the process can handle in order to enable forming a composite having optimal desired physical characteristics. Good results are generally obtained by selecting fiber tows for carbon in the range of about 4K to about 50K and fiber tows for glass in the range of about 100 to about 1600 yield (Yards/pound) or 5000 to about 250 tex (grams/1000 meters).

Typically, individual fiber sizes are selected within the range of about 8 to about 25 μm for glass fibers. Good results are obtained using glass fibers having a diameter in the range of about 8 to about 13 μm. Typically, carbon fibers are selected within the range of about 5 to about 10 μm. Good results are achieved using carbon fibers in the range of about 7 to about 8 μm in diameter. For other types of fibers a suitable size range is determined in accordance with the desired physical properties. The ranges are selected based on optimal wet-out characteristics and feasibility. For example, fibers less than about 5 μm are so small in diameter that they pose certain health risks to those that handle the fibers. On the other end, fibers exceeding 25 μm in diameter are difficult to work with because they are stiffer and more brittle.

Composite cores of the present invention comprise fiber tows that are substantially continuous in length. In practice, carbon fiber tows comprising the present invention are preferably between about 3000 and 6000 meters in length, depending on the size of the spool. However, glass fiber lengths can range up to 36 km depending on the size of the spool. Fibers can be selected in the range of 1000 to 33,000 meters. Selection of length of fiber can be based on the longest fibers that the processing equipment will accommodate to form a continuous composite core in excess of 6000 feet, such as in excess of 3000 meters. In addition, fiber ends may be glued or spliced end-to-end forming a substantially longer continuous fiber tow length. Continuous towing orients the fibers longitudinally along the cable.

Composite cores of the present invention comprise fibers having a high packing efficiency relative to other conductor cable cores. In particular, traditional steel conductor cables generally comprise several round steel wires. Due to the round shape of the wires, the wires cannot pack tightly together and can only achieve a packing efficiency of about 74%. The only way that a steel core could have 100% packing efficiency would be to have a solid steel rod as opposed to several round steel wires. This is not possible because the final cable would be to stiff and would not bend. In one embodiment of the present invention, individual fibers are oriented longitudinally, i.e., substantially parallel to the longitudinal axis, and each fiber is substantially coated with resin and cured to form a hybridized composite core member thereby approaching 100% packing efficiency. Higher packing efficiency yields a composite strength that is greater for a given volume relative to other cables. In addition, higher packing efficiency allows for formation of a composite core of smaller diameter thereby increasing the amount of aluminum conductor material capable of wrapping around the composite conductor core.

Composite cores of the present invention comprise reinforcing fibers that are substantially heat resistant. Heat resistance enables an ACCC cable to transmit increased power due to the ability of the composite core to withstand higher operating temperatures. The fibers used in the present invention have the ability to withstand very high operating temperatures, for example between the range of 300 to 500° C., or even higher. Some limitations are introduced depending on the resin matrix. Typically, depending on the characteristics of the resin, the fiber/resin matrix can withstand operating temperatures between the range of about −40 and about 240° C. Under ambient conditions with no current flowing in an ACCC cable, the composite core is able to withstand temperatures as low as about −40° C. without suffering impairment of physical characteristics.

Resin

The resin or matrix assists the fibers to act as a single unit to withstand the physical forces on the ACCC cable. The matrix material may be any type of inorganic or organic material that can embed and bundle the fibers into a composite core. The matrix can include, but is not limited to, materials such as glue, ceramics, metal matrices, resins, epoxies, modified epoxies, foams, elastomers, epoxy plastics, thermoplastics, epoxy phenolic blends, or other high performance polymers such as PEEK or PEAR. One skilled in the art will recognize other materials that may be used as matrix materials.

While other materials may be used, an exemplary embodiment of the invention uses modified epoxy resins. Throughout the remainder of the invention the term resin or epoxy may be used to identify the matrix. However, the use of the terms epoxy and resin are not meant to limit the invention to those embodiments, but all other types of matrix material are included in the invention. The composite core of the present invention may comprise resins having physical properties that are adjustable to achieve the objects of the present invention. Further, resins according to the present invention comprise a plurality of components that may be adjusted and modified according to the invention.

The present invention may use any suitable resin or a combination of resins for each fiber type. In addition, in various embodiments, resins are designed for ease of fabrication. In accordance with the invention, various resin viscosities may be optimized for high reactivity and faster production line speeds. In one embodiment, an epoxy anhydride system may be used. An important aspect of optimizing the resin system for the desired properties of the core as well as fabrication is selecting an optimal catalyst package. According to the invention, the catalyst (or 'accelerator') should be optimized to generate the greatest amount of cure of the resin components in a short time with the least amount of side reaction that could cause cracking for instance. In addition, it is further desirable if the catalyst is inactive at low temperature for increased pot life and very active at high temperatures for the fastest pull times during fabrication. The composite core of the present invention can comprise a resin having a low coefficient of thermal expansion. A low coefficient of thermal expansion reduces the amount of sag in the resulting cable. A resin of the present invention may have a coefficient of thermal expansion below about $4.2 \times 10^{-5}$/C and possibly lower than $1.5 \times 10^{-5}$% C. The composite core of the present invention can comprise a resin having an elongation greater than about 3% or more preferably about 4.5%.

In one embodiment, a vinyl ester resin may be specifically designed for high cure temperature processes. Another example is a liquid epoxy resin that is a reaction product of epichlorohydrin and bisphenol-A. Yet another example is a high purity bisphenol-A diglycidyl ether. Other examples would include polyetheramides, bismalimides, various anhydrides, or imides. In addition, curing agents may be chosen according to the desired properties of the end composite core member and the processing method. For example, curing agents may be aliphatic polyamines, polyamides and modified versions of these. Other suitable resins may include thermosetting resins, thermoplastic resins or thermoplastically modified resins, toughened resins, elastomerically modified resins, multifunctional resins, rubber modified resins, Cyanate Esters, or Polycyanate resins. Some thermosetting and thermoplastic resins may include, but are not limited to, phenolics, epoxies, polyesters, high-temperature polymers (polyimides), nylons, fluoropolymers, polyethelenes, vinyl esters, and the like. One skilled in the art will recognize other resins that may be used in the present invention.

Suitable resins may also be selected according to the process for formation of the composite core to minimize friction during processing, to increase processing speed, and to achieve the appropriate fiber to resin ratio in the final composite core. In accordance with the invention, the resins may comprise a viscosity preferably in the range of about 50 to about 10,000 cPs and preferably in the range of about 500 to about 3,000 cPs and more preferably in the range of about 800 to about 1800 cPs. These viscosities may be altered by preheating them during the pultrusion process. Further, the resin may comprise surfactants to aid in reducing surface tension in order to improve production line speeds and surface quality.

The composite core of the present invention comprises resins having good mechanical properties and chemical resistance. These resins may be able to function with prolonged environmental exposure for at least 40 years of usage. More preferably, the composite core of the present invention can comprise resins having good mechanical properties and chemical, water and UV resistance at prolonged exposure for at least about 80 years of usage. Further, the composite core of the present invention comprises resins that may operate anywhere from −45° C. to 240° C., or higher, with minimal reduction of structural performance characteristics at the temperature extremes.

Generally, elongation properties of the resin system should exceed that of glass, carbon, or other fibers being utilized. For example, an embodiment of an epoxy system may include low viscosity multifunctional epoxy resin using an anhydride hardener and an imidazol accelerator. An example of this type of epoxy system may be the ARALDITE™ MY 721/Hardener 99-023/Accelerator DY 070 hot curing epoxy matrix system by Huntsman Inc. and specified in the like titled data sheet dated September 2002. The resin has a chemical description of N,N,N',N'-Tetraglycidyl-4,4'-methylenebisbenzenamine. The hardener is described as 1H-Imidazole, 1-methyl-1-Methylimidazol. This exemplary resin epoxy system, modified specifically for the ACCC application can have the following properties: a tensile elongation around 3.0% to 5%; a flexural strength around 16.5 Ksi to 19.5 Ksi; a tensile strength around 6.0 Ksi to 7.0 Ksi; a tensile modulus around 450 Ksi to 500 Ksi; and a flexural elongation around 4.5% to 6.0%. Another embodiment of an epoxy resin system may be a multifunctional epoxy with a cycloaliphatic-amine blend hardener. An example of this type of epoxy system may be the JEFFCO1401-16/4101-17 epoxy system for infusion by JEFFCO Products Inc. and specified in the like titled data sheet dated July 2002. This exemplary resin epoxy system can have the following properties: a Shore D Hardness around 88 D; an ultimate tensile strength of 9.7 Ksi; an elongation at tensile strength around 4.5% to 5.0%; an ultimate elongation around 7.5% to 8.5%; a flexural strength around 15.25 Ksi; and an ultimate compressive strength around 14.5 Ksi. These embodiments of the epoxy resin system are exemplary and are not meant to limit the invention to these particular epoxy resin systems. One skilled in the art will recognize other epoxy systems that will produce composite cores within the scope of this invention.

Typically, the resin is tough enough to withstand splicing operations without allowing the composite body to crack. The composite core of the present invention may comprise resins having a neat resin fracture toughness at least about 0.96 MPa·m$^{1/2}$.

Each fiber type of the composite core may have a different fiber/resin ratio by weight relative to the other fibers. This is accomplished by selecting the appropriate number of each fiber type and the appropriate resin type to achieve the desired ratio. For example, a composite core member having a carbon/epoxy inner core surrounded by an outer glass/epoxy layer may comprise 56 spools of 220 yield glass fibers and epoxy resin having a viscosity of about 2000 to about 6000 cPs at 50° C. which yields a pre-determined fiber/resin ratio of about 75/25 by weight. Good results can be obtained by tuning the resin to achieve the desired viscosity for the process. The composite may also have 30 spools of carbon fiber and epoxy resin having a viscosity of about 2000 to about 6000 cPs at 50° C. which yields a predetermined fiber/resin ratio of about 70/30 by weight. Changing the number of spools of fiber changes the fiber/resin by weight ratio thereby changing the physical characteristics of the composite core product. Alternatively, the resin may be adjusted thereby increasing or decreasing the resin viscosity to change the fiber/resin ratio. The density of the fibers and the resin are used to calculate the values. The fiber/resin fraction by weight should be at least 60% to about 82%. Good results are obtained in the range of about 67-69%. Selecting too high a fiber fraction, results in a core that has insufficient shear strength in between filaments of the fibers resulting in decreased flexural strength. Conversely, too much resin tends to degrade the process. More filler must be added in this situation which may effectively degrade the properties of the composite core.

Alternatively, the fiber/resin fraction can be determined by volume. Composite cores of the present invention may comprise longitudinal fibers embedded within a resin matrix having a fiber/resin volume fraction ratio of about 70:30%. The volume fraction is the area of fiber divided by the total area of the cross section wherein the volume of the fiber will determine the final percentage ratio by weight. Good results can be obtained when the volume fraction of fiber in the fiber/resin composite is within the range of about 68 to about 72%. The fiber to resin ratio can be varied within limits that are process dependent.

In accordance with the present invention, the composite core is designed to optimize the specialized characteristics of the ACCC conductor. Good results can be obtained by designing a composite core having a high modulus inner core surrounded by a more flexible and protective outer layer. An optimized core utilizes continuous fibers having a volume fraction greater than 65%.

In various embodiments, fibers forming an optimized composite core are selected having a tensile strength in the range of about 350 to about 750 Ksi; a modulus of elasticity preferably in the range of about 22 to about 37 Msi; a coefficient of thermal expansion in the range of about −0.7 to about 0 m/m/° C.; yield elongation percent in the range of about 1.5 to 3%; dielectric properties in the range of about 0.31 W/m·K to about 0.04 W/m·K; and density in the range of about 0.065 lb/in$^3$ to about 0.13 lb/in$^3$.

In various embodiments, fibers forming the outer low modulus layer surrounding the optimized composite core are selected having a tensile strength in the range within about 250 to 450 Ksi; a modulus of elasticity preferably in the range of about 8 to 16 Msi; a coefficient of thermal expansion in the range of about $5 \times 10^{-6}$ to about $10 \times 10^{-6}$ m/m/° C.; yield elongation percent in the range of about 3 to about 6%; and dielectric properties in the range of about 0.034 to about 0.04 W/m·K and density in the range of about 0.065 to about 0.13 lbs/in$^3$.

Selection of fiber types having different CTE's can create residual stresses in the core. The CTE of each fiber type contributes to the physical properties of the core. CTE refers to the change in length per unit length of material for a one degree Centigrade change in temperature. The magnitude of the CTE depends on the structure of the material. Residual stresses created by different CTE's tend to concentrate at the interface between the fiber types.

Processing contributes to creation of residual stresses. In a typical process, the composite core is manufactured by pulling the wet-out fibers through one or more series of dies which are held at elevated temperatures, the temperatures determined, at least in part, by the properties of the resin. For example, carbon and glass fibers have different CTE's. Due to the respective CTE's for each glass and carbon fibers, during heating glass expands to a greater extent than carbon. During cooling, glass fibers contract. Accordingly, during the cooling process, the contracting forces of the glass fibers exceed that of the carbon fibers thus forcing the carbon fibers into a state of compression. As a result, the differences in the CTE between glass and carbon fibers results in a mismatch between the fibers thereby creating residual stresses within the core. One reason for failure of a longitudinally oriented carbon/glass core due to bending is compressive failure on the inside of the bend from the glass. The interface between the two fibers is a highly stressed bond line. In a composite core, the interface has high interlaminar shear strength. Information concerning residual stresses of the core was disclosed in U.S. patent application Ser. No. 11/210,052 entitled, Aluminum Conductor Composite Core Reinforced Cable and Method of Manufacture, which is incorporated in its entirety by reference herein.

One way to minimize interlaminar shear strength is to create a rough interface between the glass and carbon fibers within the core. This can be done by introducing the glass fibers during manufacturing at an angle sufficient to create an uneven interface. An uneven interface effectively reduces at least a portion of the shear strength of a composite core having two or more fiber types having different CTE's.

Residual stresses between varying fiber types can be reduced by designing a core comprised of a single fiber type. However, some single fiber cores suffer from other inherent difficulties. One example is a composite core comprised of E-glass. In particular, E-glass often contains boron. Boron acts as a catalyst with any moisture within the core to create acid. The acid degrades the fibers and can subsequently lead to failure of the core and cable. In addition, although a core comprised of E-glass may achieve the desired flexibility to permit winding for transportation, the strength of the fibers is not sufficient to prevent excessive sagging of the core. Accordingly, to achieve a single fiber composite core the fiber type should be selected having a sufficient tensile strength, sufficient flexibility, and a relatively low CTE to prevent excess sagging of the cable itself. The composite core should have sufficient strength to be able to withstand sagging under extreme conditions such as ice loading.

A composite core comprised of carbon fibers also has some inherent difficulties. When carbon is in direct contact with aluminum, under certain conditions, the carbon may react with the aluminum conductor which leads to galvanic corrosion of the core and eventual core failure.

In one example, providing a glass outer layer between the carbon fibers and the aluminum can effectively minimize the galvanic reaction. However, as discussed above, depending on the physical properties of the fibers, residual stresses or increased shear strength may be created at the interface between the fiber types within the core. A carbon/glass core will be discussed for simplicity. It should be appreciated, however, that any number of variations of fiber types can be used. In one embodiment, to reduce shear strength created at the carbon/glass interface, the glass fibers may be overlaid at an angle. In a unidirectional core, fibers are oriented substantially parallel to the longitudinal axis. In one embodiment, for example, the carbon fibers may be oriented substantially parallel to the longitudinal axis and run through a first heated die. Subsequently, glass fibers may be introduced at off-axis angles or geometries. This can be achieved for example, by winding the fibers helically about the longitudinal axis of the composite core. The winding of the fibers may be at any angle that is not substantially parallel with respect to the longitudinal axis. The fiber orientation can be measured with respect to the longitudinal axis and an axis perpendicular to the longitudinal axis. Thus, the off-axis fiber orientation can be any orientation from near 0° to near 360° with respect to the longitudinal axis. In other words, the angle can be any angle that is greater than substantially parallel to the longitudinal axis. Off-axis fiber arrangements have been discussed in U.S. Pat. No. 7,211,319 entitled, Aluminum Conductor Composite Core Reinforced Cable and Method of Manufacture, the contents of which is incorporated in its entirety by reference herein.

With off-angle or off-axis overlay, the fibers surrounding the longitudinally extending fibers mimic the carbon due to their increased elongation as a result of the off-axis angle. Thus, overwinding fibers effectively reduces the tension on the glass and the compression on the carbon. This configuration facilitates alleviation of the bending stress because compression of the carbon fibers is less and tension of the glass fibers is reduced in comparison to a glass fiber having a parallel orientation with respect to the longitudinal axis. If the loads on each fiber type are reduced, the interface is more effective. Thus, although the area of the interface cannot be changed, if the fiber orientation angle is changed, the differential is reduced between the compression and the tension and the overall stress per square inch is reduced at the interface.

In various embodiments, the winding may be in the + and − direction or in the + or − direction. In other words, the fibers may be wound in a clockwise or counterclockwise direction. In an exemplary embodiment, the fibers would be helically wound around the longitudinal axis at an angle to the longitudinal axis. In some embodiments, the core may not be formed in radial layers. In some embodiments, the fibers surrounding the inner carbon fibers may comprise more than one layer of overwinding. For example, a first layer of fibers may have one off-axis orientation while a second layer of fibers may have a second off-axis orientation.

In various embodiments, the fibers may be interlaced or braided. For example, one set of fibers may be helically wound in one direction while a second set of fibers is wound in the opposite direction. As the fibers are wound, one set of fibers may change position with the other set of fibers. In other words, the fibers would be woven or crisscrossed. These sets of helically wound fibers also may not be braided or interlaced but may form concentric layers in the core. In another embodiment, a braided sleeve may be placed over the core and embedded in the final core configuration. Also, the fibers may be twisted upon themselves or in groups of fibers. One skilled in the art will recognize other embodiments where the fiber orientation is different. Those different embodiments are included within the scope of the invention. Thus, the present invention includes all multidirectional geometries. One skilled in the art will recognize other possible angular orientations.

In an alternate embodiment, for a single fiber carbon core, the problem of galvanic reaction may be addressed by sheathing the carbon core with a thermoplastic overjacket. The thermoplastic sheath makes the effective size of the core smaller because the outside is able to bend more readily as the outer surface is not as stiff. In one example, the thermoplastic may be co-extruded with the pultruded core. In another example, the carbon may be co-cured with the thermoplastic. It will be recognized that other types of coatings to minimize the interaction between the carbon fibers and the aluminum conductor may be used, e.g., a teflon coating, or a second resin type cured with the inner carbon core. In various embodiments, the resins may be selected from the resins as discussed above.

Alternatively, a series of small diameter carbon rods may be pultruded, combined and sheathed with a thermoplastic overjacket or a fiber reinforced thermoplastic overjacket. In one example, the pultruded sections may comprise additional geometric shapes to optimize the space within the jacket.

According to various embodiments, a variety of different sheath materials may be used with or without fiber reinforcement. The use of a protective sheath that is un-reinforced with fibers may simply be used as an alternate method of reducing moisture, chemical, or UV absorption into a particular matrix or resin material that may be susceptible to these exposures but that may have other redeeming and/or favorable qualities.

In yet another embodiment, fiber reinforced thermoplastic, the fibers oriented at an angle with respect to the longitudinal axis, may be used. Some examples of sheath reinforcing materials are glass fibers, including S-2 glass, basalt, hypertext and additional fibrous materials as are known in the art. The sheath reinforcing materials could be any fiber type as disclosed herein, however, for purposes and simplicity of description, glass fibers will be referenced. In one example, the longitudinally oriented carbon fibers are embedded in a thermoset resin matrix surrounded by off-axis oriented glass fibers embedded in a thermoset resin matrix.

In one example, the fibers of the inner core and the off-axis overlay may comprise a single fiber type. Alternatively, fibers of the inner core may comprise a fiber type having different physical properties as the off-axis fibers. In addition, the off-axis fibers may comprise two or more fiber types selected to achieve the desired physical properties of the composite core.

Any number of resins and resin combinations can be used, e.g., higher temperature thermoplastics capable of reaching 300° C. and some to 600° C. One of skill in the art will be able to select compatible fiber types and resin types and based on the physical characteristics of each, design a composite core to meet the desired specifications of a particular application.

A variety of manufacturing methods may be used to achieve a composite core having overwound fibers. In one example, a higher tensile strength core, for example, carbon, is pultruded and a sheath co-extruded after the first die around the core in line or as a secondary process. In another example, a thermoplastic is applied to the outside of a fiber overlay. In another example, the fibers are thermoplastic impregnated and overlaid to surround the longitudinally extending high tensile strength inner fibers of the core.

Particular combinations of reinforcing fibers may be selected based on the reinforcing fiber's inherent physical properties in order to produce a composite core product having a wide range of physical properties. In particular, to design an ACCC cable able to withstand ampacity gains (resulting in higher operating temperatures), the composite core comprises both a higher strength, lighter weight and a lower CTE than the steel strand alternative. Typically, fibers are selected that are not conductive but have high dielectric properties. An ACCC cable operates at higher operating temperatures without a corresponding increase in sag. Sag versus temperature calculations require input of tensile strength, thermal expansion coefficient, modulus of elasticity, weight of the composite core and overall conductor weight. Accordingly, these physical characteristics are taken into account in designing the composite core.

In one embodiment, the composite core comprises interspersed high modulus of elasticity fibers and low modulus of elasticity fibers. Depending on the strain:failure ratio, this type of core may have to be segmented in order to achieve an appropriate degree of winding on transportation wheel. Moreover, the composite core is designed having the fiber of increased modulus of elasticity in the inner core surrounded by a fiber having a lower modulus of elasticity due to the decreased degree of strain on the inner core.

The strain capability of the composite is tied in with the inherent physical properties of the components and the volume fraction of the components. After the fiber/resin composite is selected, the strain to failure ratio of each fiber/resin composite is determined. In accordance with the present invention, the resins can be customized to achieve certain properties for processing and to achieve desired physical properties in the end product. As such, the fiber/customized resin strain to failure ratio is determined. For example, carbon/epoxy has a strain to failure ratio of 2.1% whereas glassfiber/epoxy has a strain to failure ratio above 3%. Accordingly, the composite core is designed having the stiffness of the carbon/epoxy in the inner core and the more flexible glassfiber/epoxy in the outer core to create a composite core with the requisite flexibility and low thermal expansion coefficient.

In one example, another advanced composite having mechanical properties in excess of glassfiber could be substituted for at least a portion of the carbon fibers and another fiber having the mechanical property range of glassfiber could be substituted for glassfiber. For example, basalt. The physical properties of basalt are known in the art. The basalt fibers provide increased tensile strength, a modulus of elasticity between carbon and glassfiber and an elongation percentage closer to that of carbon fibers. A further advantage is that basalt has superior dielectric properties compared to carbon. Good results can be obtained where the composite core comprises an inner strength member that is non-conductive. By designing an advanced composite core having fibers of inherent physical characteristics similar to those of carbon, surrounded by low modulus fiber outer core, a new property set for the composite core is obtained.

The composite core made in accordance with the present invention exhibit physical properties wherein these certain physical properties may be controlled by changing parameters during the composite core forming process. More specifically, the composite core forming process is adjustable to achieve desired physical characteristics in a final ACCC conductor.

Manufacturing

Multiple different methods may be used to manufacture the composite core. For example, pultrusion, extrusion, overlay or any combination thereof. In one embodiment, the composite core is pultruded through a multi-zone die.

EXAMPLE

In accordance with another embodiment of the invention, a multi-phase B-stage forming process produces a composite core member from substantially continuous lengths of suitable fiber tows and heat processable resins. In a further step, the composite core member is wrapped with high conductivity aluminum.

A process for making composite cores for ACCC cables according to the invention is described as follows. Referring to FIG. 1, the conductor core B-stage forming process of the present invention is shown and designated generally by reference number 10. The B-stage forming process 10 is employed to make continuous lengths of composite core members from suitable fiber tows or rovings and heat processable resins. The resulting composite core member comprises a hybridized concentric core having an inner and outer layer of uniformly distributed substantially parallel fibers.

In starting the operation, the pulling and winding spool mechanism is activated to commence pulling. The unimpregnated initial fiber tows extending from the exit end of the cooling portion in zone 9 serve as leaders at the beginning of the operation to pull fiber tows 12 from spools 11 through fiber tow guide 18 and the composite core processing system.

In FIG. 1, multiple spools of fiber tows 12 are contained within a rack system 14 and are provided with the ends of the individual fiber tows 12, leading from spools 11, being threaded through a fiber tow guide 18. The fibers undergo tangential pulling to prevent twisted fibers. Preferably, a pulling apparatus 36 at the end of the apparatus pulls the fibers through the apparatus. Each dispensing rack 14 comprises a device allowing for the adjustment of tension for each spool 11. For example, each rack 14 may have a small brake at the dispensing rack to individually adjust the tension for each spool. Tension adjustment minimizes caternary and crossover of the fiber when it travels and aids in the wetting process. The tows 12 are pulled through the guide 18 and into a preheating oven 20 that evacuates moisture. The preheating oven 20 uses continuous circular air flow and a heating element to keep the temperature constant.

The tows 12 are pulled into a wet out tank 22. Wet out tank 22 is filled with resin to impregnate the fiber tows 12. Excess resin is removed from the fiber tows 12 during wet out tank 22 exit. The fiber tows 12 are pulled from the wet out tank 22 to a secondary system, B-stage oven 24. The B-stage oven heats the resin to a temperature changing the liquid stage of resin to a semi-cure stage. B-stage cure resin is in a tacky stage which permits the fiber tows 12 to be bent, changed, compressed and configured. The tackiness is controlled by manipulation of the type of resin, the fiber type, thread count and size of the fibers and temperature of the oven. Fiber tows 12 maintained separated by the guide 18, are pulled into a second B-stage oven 26 comprising a plurality of consecutive bushings to compress and configure the tows 12. In the second B-stage oven 26, the fiber tows 12 are directed through a plurality of passageways provided by the bushings. The consecutive passageways continually compress and configure the fiber tows 12 into the final uniform composite core member.

Preferably, the composite core member is pulled from the second B-stage oven 26 to a next oven processing system 28 wherein the composite core member is cured and pulled to a next cooling system 30 for cooling. After cooling, the composite core is pulled to a next oven processing system 32 for post curing at elevated temperature. The post-curing process promotes increased cross-linking within the resin matrix resulting in improved physical characteristics of the composite member. The process generally allows an interval between the heating and cooling process and the pulling apparatus 36 to cool the product naturally or by convection such that the pulling device 34 used to grip and pull the product will not damage the product. The pulling mechanism pulls the product through the process with precision controlled speed.

Referring now more particularly to FIG. 1, in a preferred embodiment, the process continuously pulls fiber from left to right of the system through a series of phases referred to herein as zones. Each zone performs a different processing function. In this particular embodiment, the process comprises 9 zones. The process originates from a series of fiber dispensing racks 14 whereby a puller 34 continuously pulls the fibers 12 through each zone. One advantage to the puller system is that it functions as a continuous pulling system driven by an electrical motor as opposed to the traditional reciprocation system. The puller system uses a system of two belts traveling on the upper and lower portions of the product squeezing the product there between. Accordingly, the puller system embodies a simplified uniform pulling system functioning at precision controlled speed using only one device instead of a multiplicity of interacting parts functioning to propel the product through the process. Alternatively, a reciprocation system may be used to pull the fibers through the process.

The process starts with zone 1. Zone 1 comprises a type of fiber dispensing system. Fibers that can be used for example are: glass fibers, carbon fibers, both HM and HS (pitch and PAN based), basalt fibers, Aramid fibers, liquid crystal fibers, Kevlar fibers, boron fibers, high performance polyethylene fibers and carbon nanofiber (CNF). In one embodiment, the fiber dispensing system comprises two racks 13 each rack containing a plurality of spools 11 containing fiber tows 12. Further, the spools 11 are interchangeable to accommodate varying types of fiber tows 12 depending on the desired properties of the composite core member.

For example, a preferred composite core member formed by the B-stage forming process comprises a carbon/resin inner core surrounded by a glass/resin outer core layer. Preferably, high strength and high quality carbon is used. The resin matrix also protects the fibers from surface damage, and prevents cracking through a mass of fibers improving fracture resistance. The conductor core B-stage forming process 10 creates a system for pulling the fibers to achieve the optimum degree of bonding between fibers in order to create a composite member with optimal composite properties.

As previously mentioned, the components of the composite core are selected based on desired composite core characteristics. One advantage of the process is the ability to adjust composite components in order for a composite core to achieve the desired goals of a final ACCC cable, namely, a cable that can carry current without undue thermal expansion causing sag and without tensile strength reduction. It is preferable to combine types of fibers to combine the physical characteristics of each. Performance can be improved by forming a core with increased strength and stiffness, coupled with a more flexible outer layer. The process increases the optimal characteristics of the composite by preventing twisting of rovings leading to more uniform wetting and strength characteristics.

For example, in a preferred embodiment of the composite core member, the composite core comprises glass and carbon. Using the B-stage forming process, the racks 13 hold 126 spools 11 of glass and 16 spools 11 of carbon. The fiber tows 12 leading from spools 11 are threaded through a fiber tow guide 18 wherein fiber tow passageways are arranged to provide a configuration for formation of a core composite member having a uniform carbon core and outer glass layer. The carbon layer is characterized by high strength and stiffness and is a weak electrical conductor whereas the outer low modulus glass layer is more flexible and non-conductive. Having an outer glass layer provides an outer insulating layer between the carbon and the high conductivity aluminum wrapping in the final composite conductor product.

The fiber dispensing system dispenses fiber tangent from the fiber package pull. Tangent pull from the spool will not twist the fiber. The center pull method will twist fibers dispensed from the spool. As such, the center pull method results in an increased number of twisted fibers. Twisted fiber will occasionally lay on top of other twisted fiber and create a composite with multiple spots of dry fiber. It is preferable to use tangent pull to avoid dry spots and optimize wet out ability of the fibers.

Figure 2:
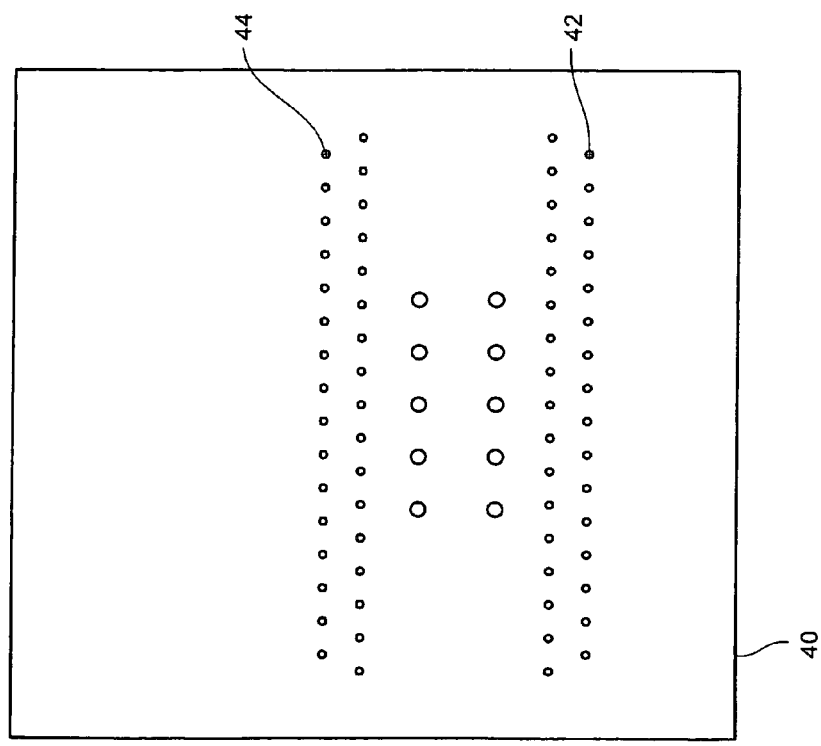
FIG. 2 is a schematic diagram of a bushing showing sufficiently spaced passageways for insertion of the fibers in a predetermined pattern to guide the fibers through the B-stage forming process in accordance with the present invention.

The fiber tows 12 are threaded through a guidance system 18. Preferably, the guide 18 comprises a polyethylene and steel bushings containing a plurality of passageways in a predetermined pattern guiding the fibers to prevent the fibers from crossing. Referring to FIG. 2, the guide comprises a bushing with sufficiently spaced passageways for insertion of the fibers in a predetermined pattern. The passageways are contained within an inner square portion 40. The passageways are arranged in rows of varying number wherein the larger diameter carbon fibers pass through the center two rows of passageways 42 and the smaller diameter glass fibers pass through the outer two rows 44 on either side of the carbon passageways 42. A tensioning device, preferably on each spool, adjusts the tension of the pulled fibers and assures the fibers are pulled straight through the guide 18.

At least two fibers are pulled through each passageway in the guide 18. For example, a guide 18 comprising 26 passageways pulls 52 fibers through, wherein each passageway has two fibers. If a fiber of a pair breaks, a sensing system alerts the composite core B-stage forming process 10 that there is a broken fiber and stops the puller 34. Alternatively, in one embodiment, a broken fiber alerts the process and the repair can be made on the fly without stopping the process depending on where the breakage occurs. To repair, a new fiber is pulled from the rack 13 and glued to the broken end of the new fiber. After the fiber is repaired, the conductor core B-stage forming machine 10 is started again.

In preferred form, the fibers are grouped in a parallel arrangement for a plurality of rows. For example, in FIG. 2, there are six parallel rows of passageways. The outer two rows comprise 32 passageways, the two inner rows comprise 31 passageways, and the two center rows comprise 4 passageways each. Fibers are pulled at least two at a time into each passageway and pulled into zone 2.

Zone 2 comprises an oven processing system that preheats the dry fibers to evacuate any moisture. The fibers of the present invention are preferably heated within the range of about 150 to 250° F. to evaporate moisture.

Figure 9:
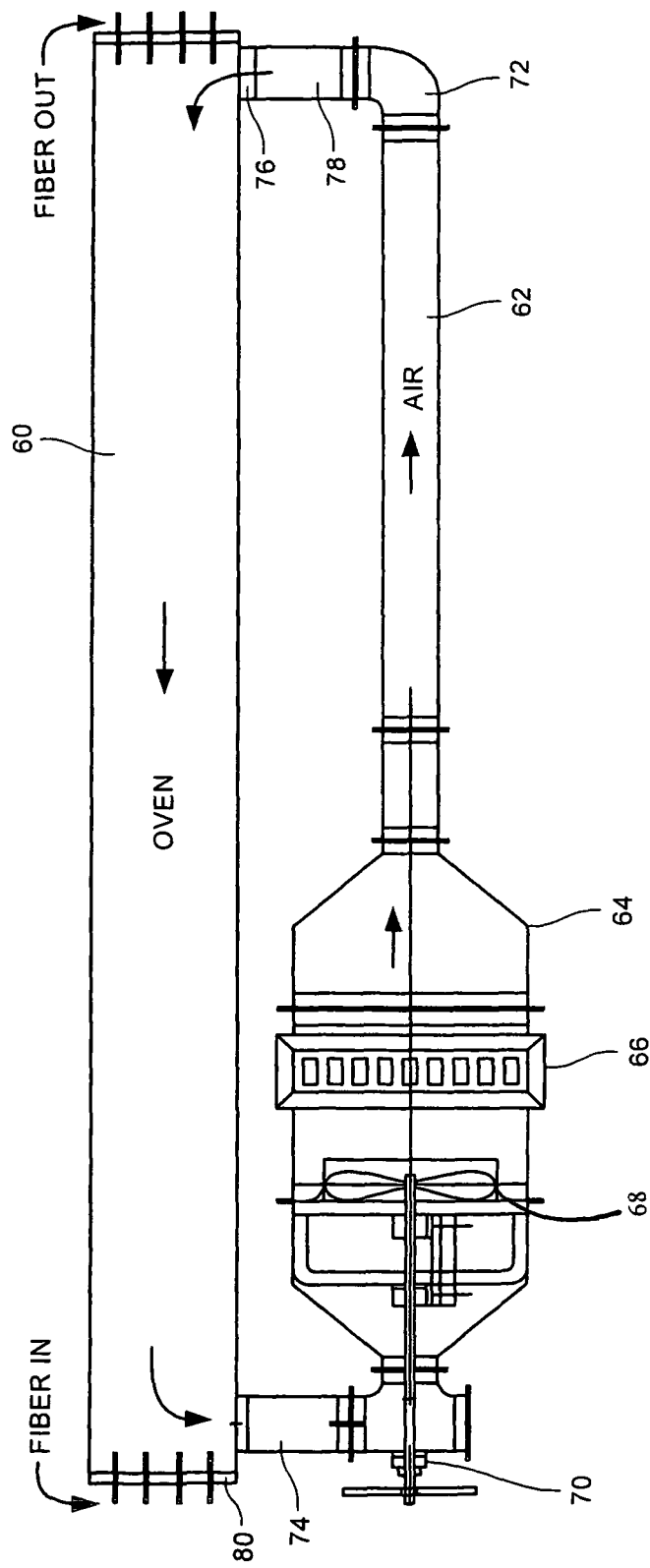
FIG. 9 is a schematic view of an oven process having cross circular air flow to keep the air temperature constant in accordance with the invention.

The oven processing system comprises an oven portion wherein the oven portion is designed to promote cross-circular air flow against the flow of material. FIG. 9 illustrates a typical embodiment of the oven system. An oven is generally designated 60. The fibers pass through the oven from upstream to downstream direction, the air passes in the reverse direction. The oven processing system comprises a heat drive system housing 64 that houses a blower 68 powered by electric motor 70 located upstream from a heater assembly 66 to circulate air in a downstream direction through air flow duct 62. The heat drive system housing houses a blower 68 upstream of the heater assembly 66. The blower 68 propels air across the heater assembly 66 and through the oven system. The air flows downstream to a curved elbow duct 72. The curved elbow duct 72 shifts air flow 90 degrees up into an inlet duct 78 and through the oven inlet 76. Through the inlet air flow shifts 90 degrees to flow upstream through the oven 60 against the pull direction of the fibers. At the end of the oven 60, the air flow shifts 90 degrees down through the oven outlet 80 through the outlet duct 74 through the motor 70 and back into the heat drive system housing 64. The motor 70 comprises an electrical motor outside of the heat drive system to prevent overheating. The motor 70 comprises a pulley with a timing belt that moves the bladed blower 68. Preferably, the system is computer controlled allowing continuous air circulation at a desired temperature. More preferably, the process allows for the temperature to change at any time according to the needs of the process.

For example, the computer senses a temperature below the required temperature and activates the heating element or deactivate the heater when the temperature is too high. The blower blows air across the heating element downstream. The system forces the air to travel in a closed loop circle continuously circulating through the oven keeping the temperature constant.

Figure 10:
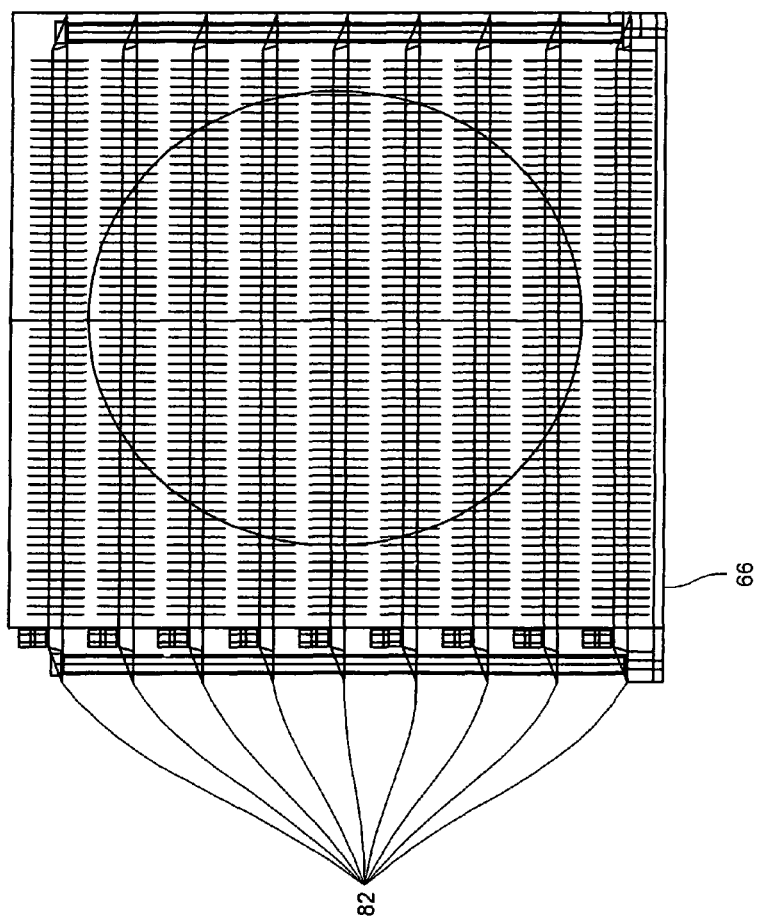
FIG. 10 is a cross-sectional view of the heating element in the oven represented in FIG. 9 showing each heater in the heating element in accordance with the invention.

FIG. 10 is a more detailed view of a preferred embodiment of the heating element 66. In one embodiment, the heater assembly comprises nine horizontal steel electrical heaters 82. Each heater unit is separate and distinct from the other heater.

Each heater unit is separated by a gap. Preferably, after sensing a temperature differential, the computer activates the number of heaters to provide sufficient heat. If the system requires the computer activates one of nine heaters. Alternatively, depending on the needs of the process, the computer activates every other heater in the heater assembly. In another embodiment the computer activates all heaters in the heater assembly. In a further alternative, the computer activates a portion of the heaters in the heater assembly or turns all the heaters off.

In an alternate embodiment, electromagnetic fields penetrate through the process material to heat the non conductive fibers and drive off any moisture. In another embodiment pulsed microwaves heat the non conductive fibers and drive off any moisture. In another embodiment, electron beam processing uses electrons as ionizing radiation to drive off excess moisture.

In another embodiment, the puller pulls the fibers from zone 2 to zone 3, the fiber impregnation system. Zone 3 comprises a wet out tank 22. In a preferred embodiment, the wet out tank 22 contains a device that allows the redirection of fibers during wet out. Preferably, the device is located in the center of the tank and moves the fibers vertically up and down perpendicular to the direction of the pull whereby the deflection causes the fibers to reconfigure from a round configuration to a flat configuration. The flat configuration allows the fibers to lay side by side and allows for the fibers to be more thoroughly wetted by the resin.

Various alternative techniques well known in the art can be employed to apply or impregnate the fibers with resin. Such techniques include for example, spraying, dipping, reverse coating, brushing and resin injection. In an alternate embodiment, ultrasonic activation uses vibrations to improve the wetting ability of the fibers.

Generally, any of the various known heat curable thermosetting polymeric resin compositions can be used with the invention. The resin may be for example, PEAR (PolyEther Amide Resin), Bismaleimide, Polyimide, liquid-crystal polymer (LCP), and high temperature epoxy based on liquid crystal technology or similar resin materials. Resins are selected based on the process and the physical characteristics desired in the composite core.

Further, the viscosity of the resin affects the rate of formation. To achieve the desired proportion of fiber/resin for formation of the composite core member, preferably the viscosity ranges within the range of about 200 to about 1500 Centipoise at 20° C. More preferably, the viscosity falls in the range of about 200 to about 600 Centipoise 20° C. The resin is selected to have good mechanical properties and excellent chemical resistance to prolonged exposure of at least 60 years and more preferably, at least 70 years of operation up to about 230° C. A particular advantage of the present invention is the ability for the process to accommodate use of low viscosity resins. In accordance with the present invention, it is preferable to achieve a fiber/resin ratio within the range of 62-75% by weight. More preferable is a fiber/resin ratio within the range of 72-75% by weight. Low viscosity resins will sufficiently wet the fibers for the composite core member. A preferred polymer provides resistance to a broad spectrum of aggressive chemicals and has very stable dielectric and insulating properties. It is further preferable that the polymer meets ASTME595 outgassing requirements and UL94 flammability tests and is capable of operating intermittently at temperatures ranging between 220 and 280° C. without thermally or mechanically damaging the strength member.

To achieve the desired fiber to resin ratio, the upstream side of the wet out tank comprises a number of redirectional wiping bars. As the fibers are pulled through the wet out tank the fibers are adjusted up and down against a series of wiping bars removing excess resin. Alternatively, the redirection system comprises a wiper system to wipe excess resin carried out of the tank by the fibers. Preferably, the excess resin is collected and recycled into the wet out tank 22.

Alternatively, the wet out tank uses a series of squeeze out bushings to remove excess resin. During the wet out process each bundle of fiber contains as much as three times the desired resin for the final product. To achieve the right proportion of fiber and resin in the cross section of the composite core members, the amount of pure fiber is calculated. The squeeze out bushing in designed to remove a predetermined percentage of resin. For example, where the bushing passageway is twice as big as the area of the cross section of the fiber, a resin concentration greater than 50% by value won't be pulled through the bushing, the excess resin will be removed. Alternatively, the bushing can be designed to allow passage of 100% fiber and 20% resin.

Preferably, a recycle tray extends lengthwise under the wet out tank 22 to catch overflow resin. More preferably, the wet out tank has an auxiliary tank with overflow capability. Overflow resin is returned to the auxiliary tank by gravity through the piping. Alternatively, tank overflow is captured by an overflow channel and returned to the tank by gravity. In a further alternate, the process uses a drain pump system to recycle the resin back through the auxiliary tank and into the wet out tank. Preferably, a computer system controls the level of resin within the tank. Sensors detect low resin levels and activate a pump to pump resin into the tank from the auxiliary mixing tank into the processing tank. More preferably, there is a mixing tank located within the area of the wet out tank. The resin is mixed in the mixing tank and pumped into the resin wet out tank.

The pullers pull the fibers from zone 3 to zone 4, the B-stage zone. Zone 4 comprises an oven processing system 24. Preferably, the oven processing system is an oven with a computer system that controls the temperature of the air and keeps the air flow constant wherein the oven is the same as the oven in zone 2.

The pullers pull the fibers from zone 3 to zone 4. The oven circulates air in a circular direction downstream to upstream by a propeller heating system. The computer system controls the temperature at a temperature to heat the wet fiber to B-stage. Preferably, the process determines the temperature. B-stage temperature of the present invention ranges from within about 200 to 250° F. One advantage of the B-stage semi-cure process in the present invention is the ability to heat the resin to a semi-cure state in a short duration of time, approximately 1-1.5 minutes during the continuation of the process. The advantage is that the heating step does not affect the processing speed of the system. The B-stage process allows for the further tuning of the fiber/resin ratio by removing excess resin from the wet-out stage. Further, B-stage allows the fiber/resin matrix to be further compacted and configured during the process. Accordingly, the process differs from previous processes that use pre-preg semi-cure. Heating semi-cures the fibers to a tacky stage.

More specifically, in traditional composite processing applications, the wetted fibers are heated gradually to a semi-cure stage. However, the heating process generally takes periods of one hour or longer to reach the semi-cure stage. Moreover, the composite must be immediately wrapped and frozen to keep the composite at the semi-cure stage and prevent curing to a final stage. Accordingly, the processing is fragmented because it is necessary to remove the product from the line to configure the product.

In accordance with the present invention, the B-stage heating is dedicated to a high efficiency commercial application wherein semi-cure is rapid, preferably 1-1.5 minutes during a continuous process in line within the process. Preferably, the resins are designed to allow rapid B-stage semi-curing that is held constant through the process allowing for shaping and configuring and further compaction of the product. The pullers pull the fibers from B-stage zone 4 to zone 5 for the formation of the composite core member. Zone 5 comprises a next oven processing system 26 having a plurality of bushings. The bushings function to shape the cross section of the fiber tows 12. Preferably, the bushings are configured in a series comprising a parallel configuration with each other. In this embodiment, there is a set of seven bushings spaced laterally within the oven processing system 26. Preferably, the spacing of the bushings are adjusted according to the process. The bushings can be spaced equi-distance or variable distance from each other.

The series of bushings in zone 5 minimize friction due to the relatively thin bushing ranging within about ½ to ⅜ inch thick. Minimizing friction aids in maximizing the process speed.

Zones 4, 5 and 6 of the present invention extends within the range of about 30-45 feet. Most preferably, the zones 4, 5 and 6 extend at least 30 feet. This pulling distance and the decreased friction due to thin bushing plates aids in achieving a desired pull speed in the range of about 9 ft/min to about 50 ft/min. Most preferably about 20 ft/min. Processing speed is further increased due to the high fiber/resin ratio.

Figure 3:
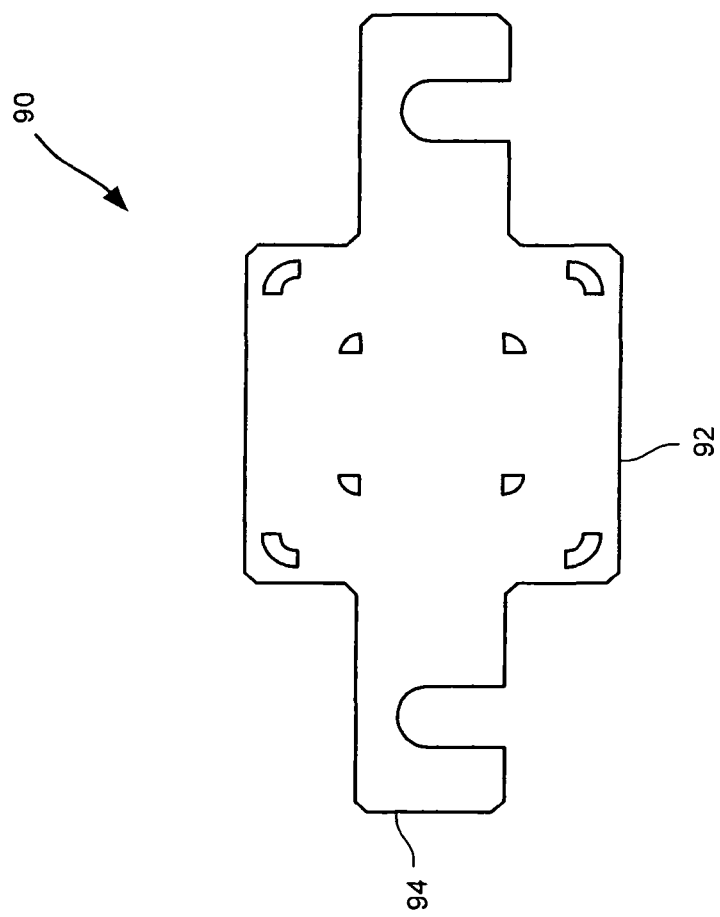
FIG. 3 is a schematic view of the structure of a bushing, said view showing the passageways used to shape and compress the bundles of reinforced fibers in accordance with the present invention.

Referring to FIG. 3, for example, the bushings 90 comprise a flat steel plate with a plurality of passageways through which the fiber tows 12 are pulled. The flat plate steel bushing 90 preferably ranges from ⅜ inch to ½ inch thick determined by the process. The bushings 90 have relatively thin walls to reduce friction and the amount of heat which must be added or removed by the heating and cooling process in order to achieve the temperature changes required to effect curing of the fiber resin matrix. The thickness of the bushing 90 is preferably the minimum thickness required to provide the structural strength necessary to constrain forces imposed upon the bushing 90 by the material passing therethrough. In particular, the thickness of the bushing 90 is preferably the minimum needed to limit deformation of the bushing wall to a tolerable level which will not interfere with the pulling of the material through the system.

Preferably, the design and size of the bushings 90 are the same. More preferably, the passageways within each bushing 90 diminish in size and vary in location within each successive bushing 90 in the upstream direction. FIG. 3 illustrates a preferred embodiment of a bushing 90. The bushing 90 comprises two hooked portions 94 and an inner preferably square portion 92. The inner square portion 92 houses the passageways through which the pulling mechanism pulls the fibers. The outer hooked portions 94 form a support system whereby the bushing 90 is placed within the oven in zone 5. The outer hooked portion 94 connects with interlocking long steel beams within the oven that function to support the bushings 90.

Figure 5:
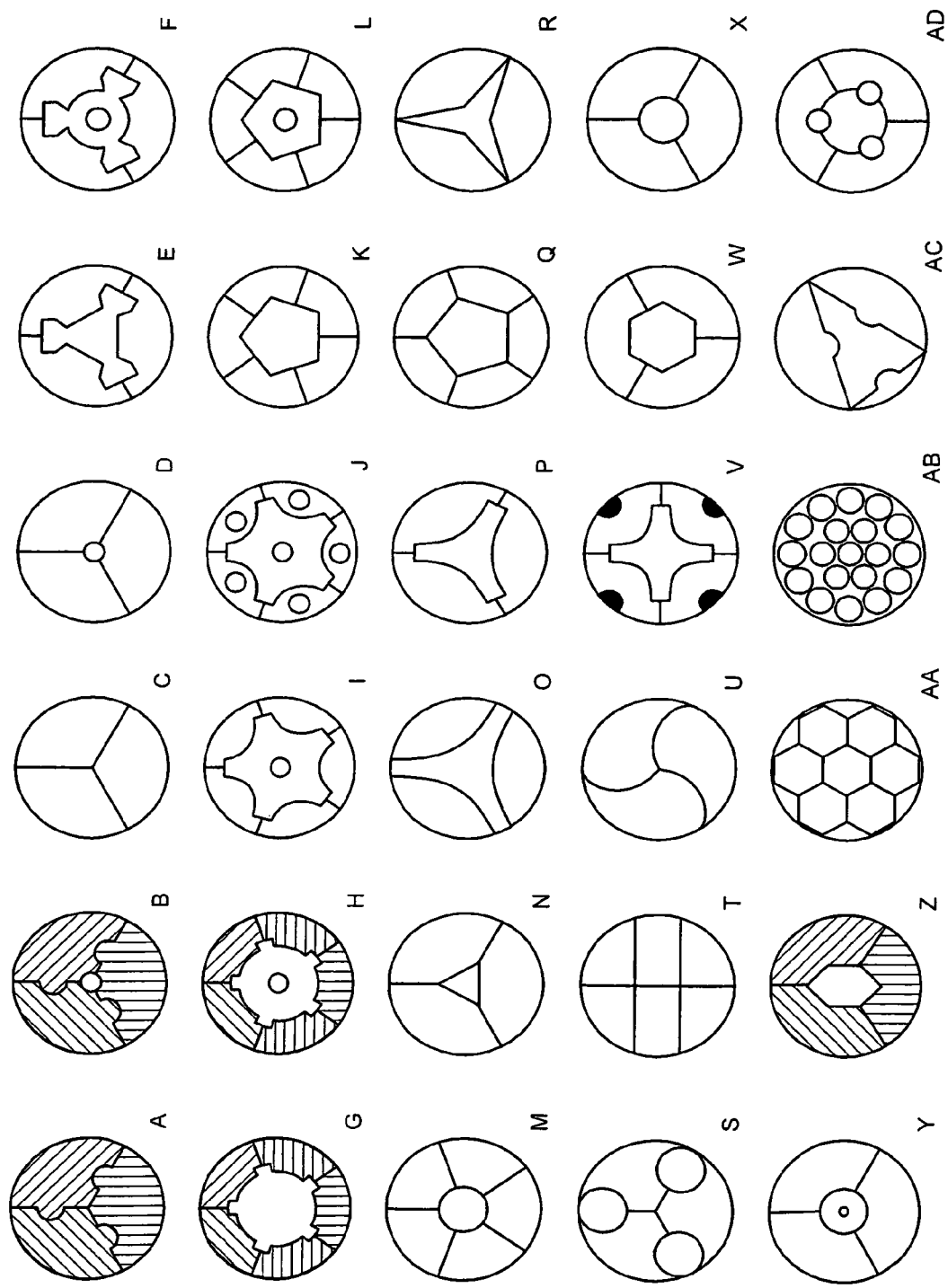
FIG. 5 shows a cross-sectional view of thirty possible composite core cross-section geometries according to the invention.

Zone 5 comprises a series of eight consecutive bushings. The bushings have two functions: (1) guide the fiber in the configuration for the final product; and (2) shape and compress the fibers. In one embodiment, the bushings 90 are placed apart within the oven supported on the hooked structures. The bushings 90 function to continually compress the fibers and form a composite core comprising, in this embodiment, carbon and glass while the process is under appropriate tension to achieve concentricity and uniform distribution of fiber without commingling of fibers. The bushings 90 may be designed to form bundles of a plurality of geometries. For example, FIG. 5 illustrates the variations in cross sections in composite member labeled A-Z, M, AB, AC and AD in the figure. Each cross section results from different bushing 90 design.

Figure 6:
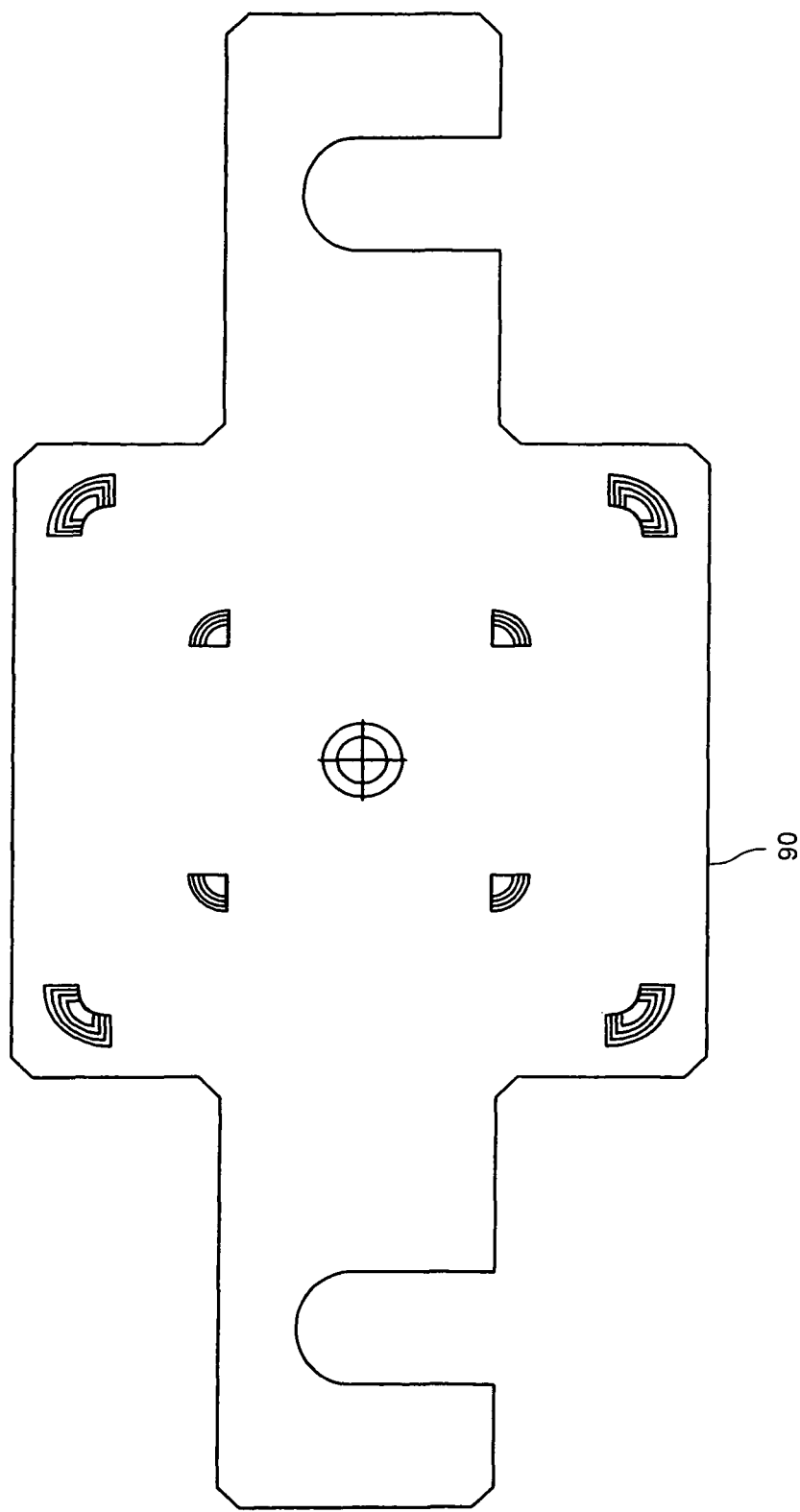
FIG. 6 is a multi-dimensional cross-sectional view of a plurality of bushings overlaid on top of one another showing the decreasing passageway size with respective bushings.

The passageways in each successive bushing 90 diminish in size further compacting the fiber bundles. For example, FIG. 6 shows each bushing 90 superimposed on top of one another. Several changes are apparent with each consecutive bushing 90. First, each overlayed bushing 90 shows that the size of each passageway decreases. Second, the superimposed figure shows the appearance of the center hole for compaction of the core element. Third, the figure shows the movement of the outer corner passageways towards the center position.

Figure 4:
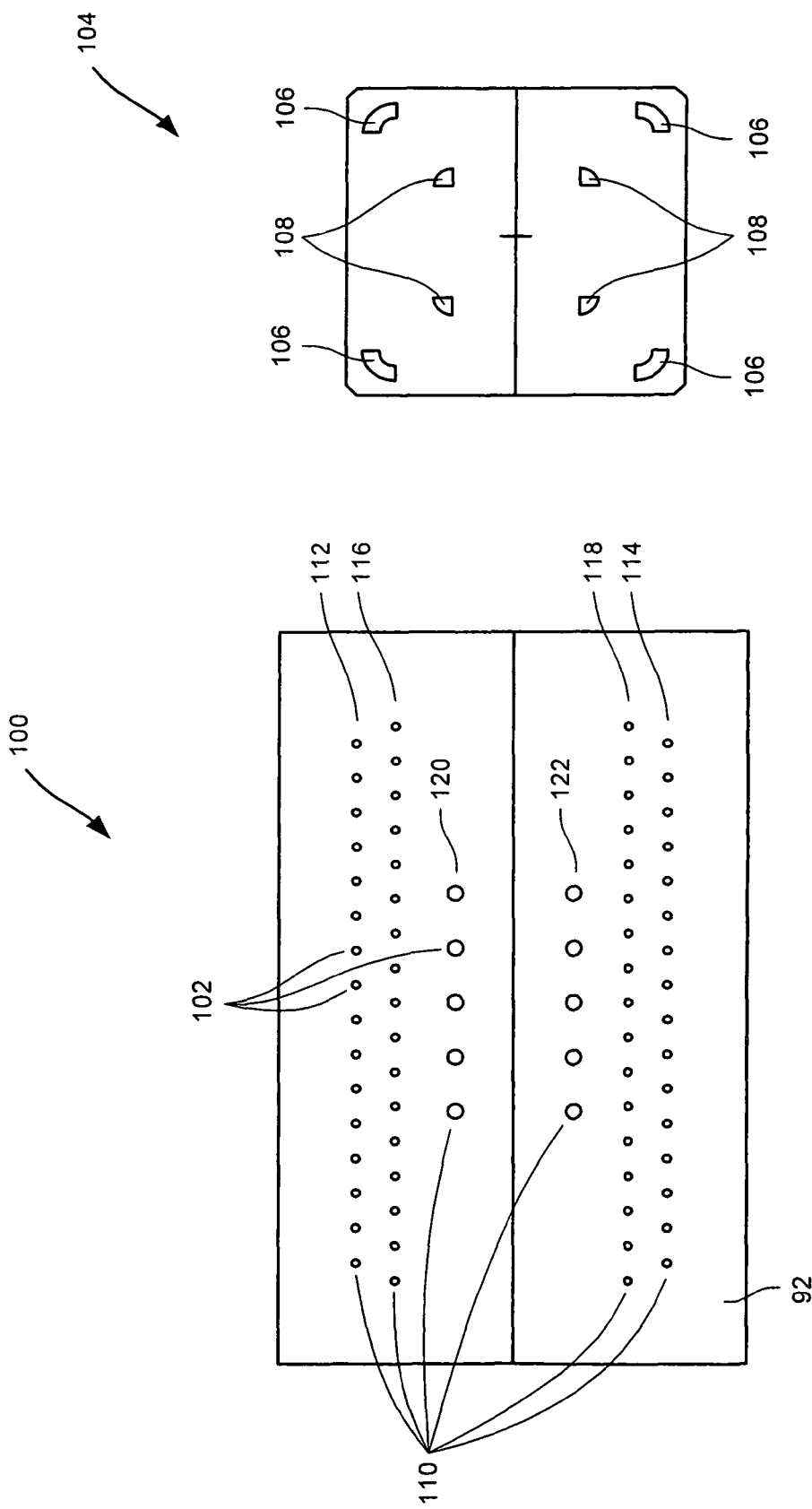
FIG. 4 is schematic comparison of two different bushings showing a reduction in the passageways from one bushing to the next to shape and compact the fibers into bundles in forming the composite core in accordance with the present invention.

Referring to FIG. 4, there are two bushings illustrated. The first bushing 100 illustrated, is in a similar configuration as the guide bushing 18. The second bushing 104 is the first in the series of bushings that function to compress and configure the composite core. The first bushing 100 comprises an inner square portion 92 with a plurality of passageways 102 prearranged through which the fibers are pulled. The passageways 102 are designed to align the fibers into groups in bushing two 104 having four outer groups 106 of fibers and four inner groups 108 of fibers. The inner square portion of the bushing 100 comprises six rows of passageways 110. The arrangement of the passageways 110 may be configured into any plurality of configurations depending on the desired cross section geometry of the composite core member. The top and bottom row, 112 and 114 respectively, contain the same number of passageways. The next to top and next to bottom rows, 116 and 118 respectively, contain the same number of passageways and the two inner rows 120 and 122 contain the same number of passageways.

In a preferred embodiment, the top and bottom rows contain 32 passageways each. The next level of rows contain 31 passageways each. The middle rows contain 4 passageways each. The pulling mechanism pulls two fibers through each passageway. Referring to FIG. 4, for example, the pulling mechanism pulls 126 glass fibers through rows 112, 114, 116 and 118. Further, the pulling mechanism pulls 16 carbon fibers through rows 120 and 122.

Figure 7:
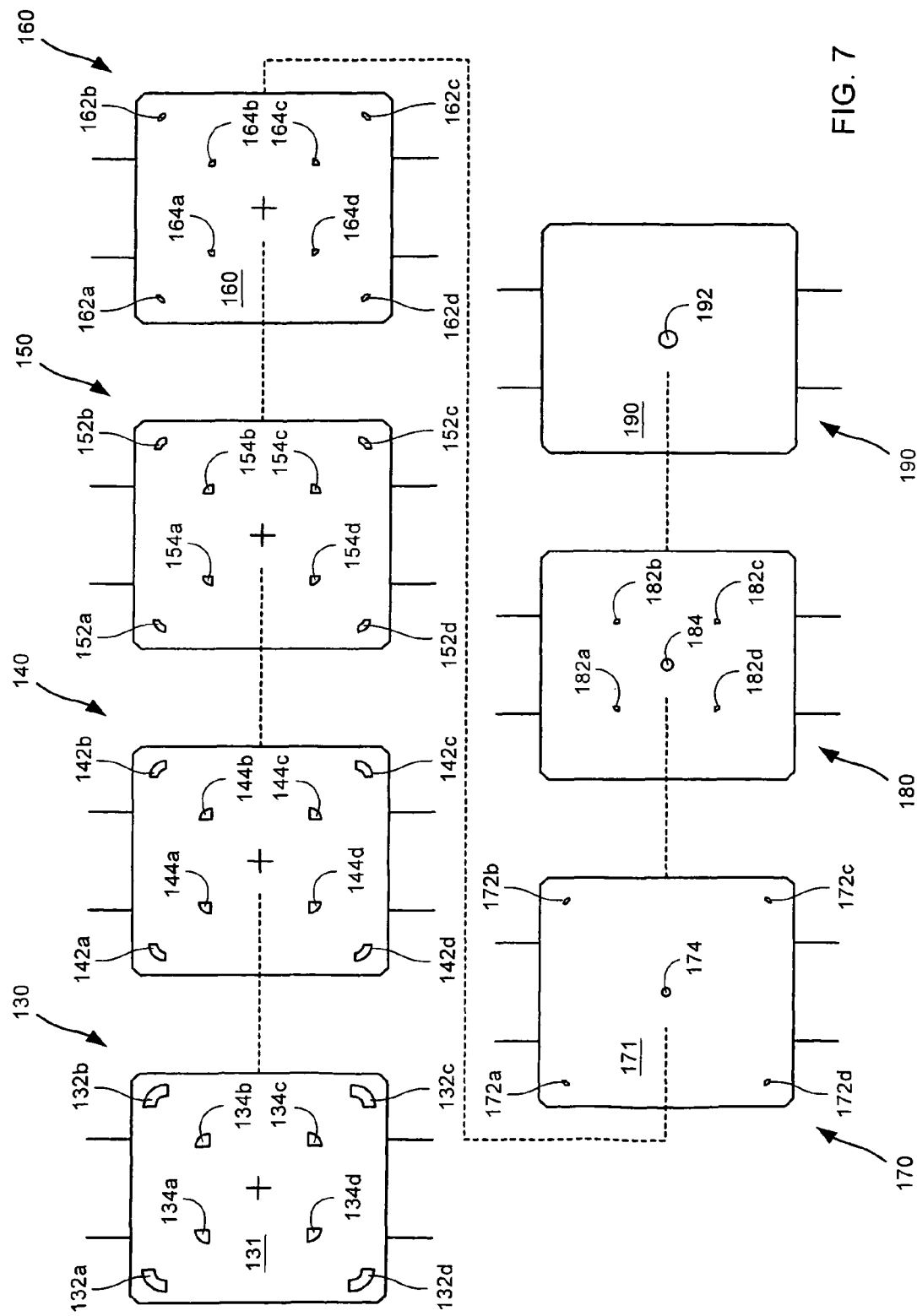
FIG. 7 is a multi-phase schematic view of a plurality of bushings showing migration of the passageways and diminishing size of the passageways with each successive bushing in accordance with the invention.

Referring to FIG. 7, the next bushing 130, bushing three in the series comprises an inner square portion 131 having four outer corner passageways 132a, 132b, 132c and 132d and four inner passageways 134a, 134b, 134c and 134d. The fibers exit bushing two and are divided into equal parts and pulled through bushing three. Each passageway in bushing three comprises one quarter of the particular type of fiber pulled through bushing two. More specifically, the top two rows of the top and the bottom of bushing two are divided in half whereby the right half of the top two rows of fibers are pulled through the right outer corner of bushing three. The left half of the top two rows of fibers are pulled through the upper left corner 132a of bushing three 130. The right half of the top two rows of fibers are pulled through the upper right corner 132b of bushing three 130. The right half of the bottom two rows of fibers are pulled through the lower right corner 132c of bushing three. The left half of the bottom two rows of fibers are pulled through the lower left corner 132d of bushing three 130. The inner two rows of bushing one are divided in half whereby the top right half of the top middle row of fibers is pulled through the inner upper right corner 134b of bushing three 130. The left half of the top middle row of fibers is pulled through the inner upper left corner 134a of bushing three 130. The right half of the lower middle row of fibers is pulled through the inner lower right corner 134c of bushing three 130. The left half of the lower middle row of fibers is pulled through the inner lower left corner 134d of bushing three 130. Accordingly, bushing three 130 creates eight bundles of impregnated fibers that will be continually compressed through the series of next bushings.

The puller pulls the fibers through bushing three 130 to bushing four 140. Bushing four 140 comprises the same configuration as bushing three 130. Bushing four 140 comprises a square inner portion 141 having four outer corner passageways 142a, 142b, 142c and 142d and four inner passageways 144a, 144b, 144c and 144d. Preferably, the four outer corner passageways 142a-d and the four inner passageways 144a-d are slightly smaller in size than the similarly configured passageways in bushing three 130. Bushing four 140 compresses the fibers pulled through bushing three.

The puller pulls the fibers from bushing four 140 to bushing five 150. Preferably, the four outer corner passageways 152a, 152b, 152c and 152d and the four inner passageways 154a, 154b, 154c and 154d are slightly smaller in size than the similarly configured passageways in bushing four 140. Bushing five 150 compresses the fibers pulled through bushing four 140.

For each of the successive bushings, each bushing creates a bundle of fibers with an increasingly smaller diameter. Preferably, each smaller bushing wipes off excess resin to approach the optimal and desired proportion of resin to fiber composition.

The puller pulls the fibers from bushing five 150 to bushing six 160. Preferably, the four outer corner passageways 162a, 162b, 162c and 162d and the four inner passageways 164a, 164b, 164c and 164d are slightly smaller in size than the similarly configured passageways in bushing five 150. Bushing six 160 compresses the fibers pulled through bushing five 150.

Bushing seven 170 comprises an inner square 171 having four outer corner passageways 172a, 172b, 172c and 172d and one inner passageway 174. The puller pulls the fibers from the four inner passageways 164 of bushing six 160 through the single inner passageway 174 in bushing seven 170. The process compacts the product to a final uniform concentric core. Preferably, fibers are pulled through the outer four corners 172a, 172b, 172c, 172d of bushing seven 170 simultaneous with compacting of the inner four passageways 164 from bushing six 160.

The puller pulls the fibers through bushing seven 170 to bushing eight 180. The puller pulls the inner compacted core 184 and the outer four corners 182a, 182b, 182c, 182d migrate inwardly closer to the core 184. Preferably, the outer fibers diminish the distance between the inner core and the outer corners by half the distance.

The puller pulls the fibers through bushing eight 180 to bushing nine 190. Bushing nine 190 is the final bushing for the formation of the composite core. The puller pulls the four outer fiber bundles and the compacted core through a passageway 192 in the center of bushing nine 190.

Figure 8:
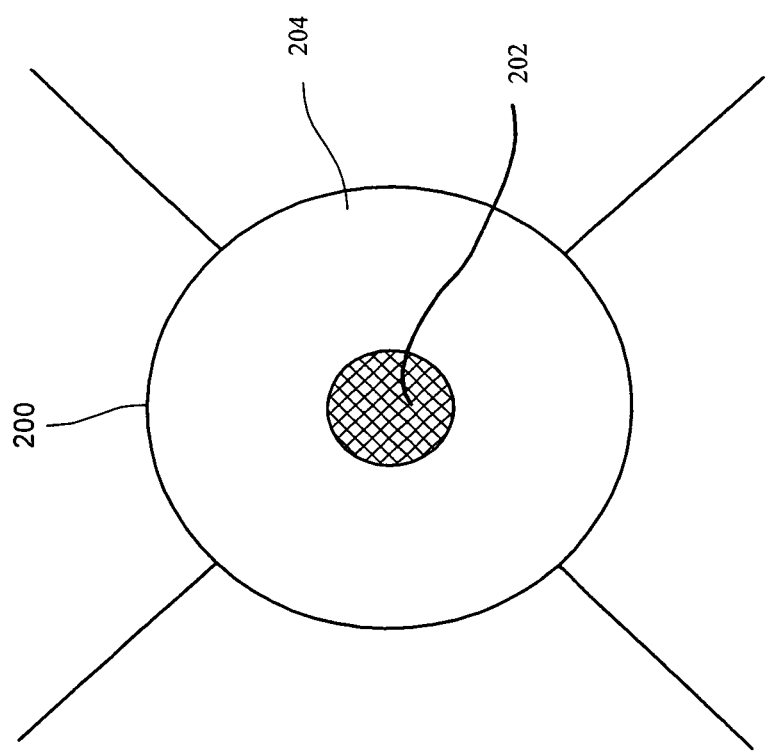
FIG. 8 is a cross sectional view of one embodiment of a composite core according to the invention.

Preferably, bushing nine 190 compacts the outer portion and the inner portion creating an inner portion of carbon and an outer portion of glass fiber. FIG. 8 for example, illustrates a cross-section of a composite cable. The example illustrates a composite core member 200 having an inner reinforced carbon fiber composite portion 202 surrounded by an outer reinforced glass fiber composite portion 204.

Temperature is kept constant throughout zone 5. The temperature is determined by the process and is high enough to keep the resin in a semi-cured state. At the end of zone 5, the product comprises the final level of compaction and the final diameter.

The puller pulls the fibers from zone 5 to zone 6 a curing stage preferably comprising an oven with constant heat and airflow as in zone 5, 4 and 2. The oven uses the same constant heating and cross circular air flow as in zone 5, zone 4 and zone 2. The process determines the curing heat. The curing heat remains constant throughout the curing process. In the present invention, the preferred temperature for curing ranges from about 350° F. to about 400° F. The curing process preferably spans within the range of about 8 to about 15 feet. More preferably, the curing process spans about 10 feet in length. The high temperature of zone 6 results in a final cure forming a hard resin.

Zone 6 may incorporate a bushing ten to assure that the final fiber composite core member holds its shape. In addition, another bushing prevents bluming of the core during curing.

During the next stages the composite core member product is pulled through a series of heating and cooling phases. The post cure heating improves cross-linking within the resin matrix improving the physical characteristics of the product. The pullers pull the fibers to zone 7, a cooling device. Preferably, the mechanical configuration of the oven is the same as in zones 2, 4, 5 and 6. More specifically, the device comprises a closed circular air system using a cooling device and a blower. Preferably, the cooling device comprises a plurality of coils. Alternatively, the coils may be horizontally structured consecutive cooling elements. In a further alternative, the cooling device comprises cooling spirals. The blower is placed upstream from the cooling device and continuously blows air in the cooling chamber in an upstream direction. The air circulates through the device in a closed circular direction keeping the air throughout at a constant temperature. Preferably, the cooling temperature ranges from within about 40 to about 180° F.

The pullers pull the composite member through zone 7 to zone 8, the post-curing phase. The composite core member is heated to post-curing temperature to improve the mechanical properties of the composite core member product.

The pullers pull the composite core member through zone 8 to zone 9, the post curing cooling phase. Once the composite core has been reheated, the composite core is cooled before the puller grabs the compacted composite core. Preferably, the composite core member cools for a distance ranging about 8 to about 15 feet by air convection before reaching the puller. Most preferably, the cooling distance is about 10 feet.

The pullers pull the composite core member through the zone 9 cooling phase into zone 10, a winding system whereby the fiber core is wrapped around a wheel for storage. It is critical to the strength of the core member that the winding does not over stress the core by bending. In one embodiment, the core does not have any twist and can only bend a certain degree. In another embodiment, the wheel has a diameter of seven feet and handles up to 6800 feet of B-stage formed composite core member. The wheel is designed to accommodate the stiffness of the B-stage formed composite core member without forcing the core member into a configuration that is too tight. In a further embodiment, the winding system comprises a means for preventing the wheel from reversing flow from winding to unwinding. The means can be any device that prevents the wheel direction from reversing for example, a brake system.

In a further embodiment, the process includes a quality control system comprising a line inspection system. The quality control process assures consistent product. The quality control system may include ultrasonic inspection of composite core members; record the number of tows in the end product; monitor the quality of the resin; monitor the temperature of the ovens and of the product during various phases; measure formation; measure speed of the pulling process. For example, each batch of composite core member has supporting data to keep the process performing optimally. Alternatively, the quality control system comprises a marking system. The marking system wherein the marking system marks the composite core members with the product information of the particular lot. Further, the composite core members may be placed in different classes in accordance with specific qualities, for example, Class A is high grade, Class B and Class C.

The fibers used to process the composite core members can be interchanged to meet specifications required by the final composite core member product. For example, the process allows replacement of fibers in a composite core member having a carbon core and a glass fiber outer core with high grade carbon and E-glass. The process allows the use of more expensive better performing fibers in place of less expensive fibers due to the combination of fibers and the small core size required. In one embodiment, the combination of fibers creates a high strength inner core with minimal conductivity surrounded by a low modulus nonconductive outer insulating layer. In another embodiment, the outer insulating layer contributes to the flexibility of the composite core member and enables the core member to be wound, stored and transported.

Another embodiment of the invention, allows for redesign of the composite core cross section to accommodate varying physical properties and increase the flexibility of the composite core member. Referring again to FIG. 5, the different composite shapes change the flexibility of the composite core member. Changing the core design may enable winding of the core on a smaller diameter wheel. Further, changing the composite core design may affect the stiffness and strength of the inner core. As an advantage, the core geometry may be designed to achieve optimal physical characteristics desired in a final ACCC cable.

In another embodiment of the invention, the core diameter is greater than 0.375 inches. A core greater than 0.375 inches cannot bend to achieve a 7-foot wrapping diameter. The potential strength on the outside bend shape exceeds the strength of the material and the material will crack. A core diameter of ½ to ⅝ inches or larger may require a wheel diameter of 15 feet and this is not commercially viable. To increase the flexibility of the composite core, the core may be twisted or segmented to achieve a wrapping diameter that is acceptable. One 360 degree twist of fiber orientation in the core for one revolution of core. Alternatively, the core can be a combination of twisted and straight fiber. The twist may be determined by the wheel diameter limit. If the limit is prohibited then twist by one revolution of diameter of the wheel. The tension and compression stresses in the core are balanced by one revolution.

Winding stress is reduced by producing a segmented core. FIG. 5 illustrates some examples of possible cross section configurations of segmented cores. The segmented core under the process is formed by curing the section as separate pieces wherein the separate pieces are then grouped together. Segmenting the core enables a composite member product having a core greater than 0.375 inches to achieve a desirable winding diameter without additional stress on the member product.

Variable geometry of the cross sections in the composite core members are preferably processed as a multiple stream. The processing system is designed to accommodate formation of each segment in parallel. Preferably, each segment is formed by exchanging the series of consecutive bushings for bushings having predetermined configurations for each of the passageways. In particular, the size of the passageways may be varied to accommodate more or less fiber, the arrangement of passageways may be varied in order to allow combining of the fibers in a different configuration in the end product and further bushings may be added within the plurality of consecutive bushings to facilitate formation of the varied geometric cross sections in the composite core member. At the end of the processing system the five sections in five streams of processing are combined at the end of the process to form the composite cable core. Alternatively, the segments may be twisted to increase flexibility and facilitate winding The final composite core is wrapped in lightweight high conductivity aluminum forming a composite cable. Preferably, the composite core cable comprises an inner carbon core having an outer insulating glass fiber composite layer and two layers of trapezoidal formed strands of aluminum.

In one embodiment, the inner layer of aluminum comprises a plurality of trapezoidal shaped aluminum segments wrapped in a counter-clockwise direction around the composite core member. Each trapezoidal section is designed to optimize the amount of aluminum and increase conductivity. The geometry of the trapezoidal segments allows for each segment to fit tightly together and around the composite core member.

In a further embodiment, the outer layer of aluminum comprises a plurality of trapezoidal shaped aluminum segments wrapped in a clockwise direction around the composite core member. The opposite direction of wrapping prevents twisting of the final cable. Each trapezoidal aluminum element fits tightly with the trapezoidal aluminum elements wrapped around the inner aluminum layer. The tight fit optimizes the amount of aluminum and decreases the aluminum required for high conductivity.

Example One

Composite Core

A particular embodiment of the invention is now described wherein the composite strength member comprises boron free E-glass and carbon with type 13 sizing. E-glass combines the desirable properties of good chemical and heat stability, and good electrical resistance with high strength. The cross-sectional shape or profile is illustrated in FIG. 8 wherein the composite strength member comprises a concentric carbon core encapsulated by a uniform layer of glass fiber composite. In a preferred embodiment the process produces a hybridized core member comprising two different materials.

The fiber structures in this particular embodiment are 54 ends of E-glass product, 220 yield Veterotex Amer and 28 ends of carbon Torayca T7DOS yield 24K. The resin used is Araldite MY 721 from Vantico.

In operation, the ends of E-glass and carbon are threaded through a fiber tow guide comprising two rows of 32 passageways, two rows inner of 31 passageways and two innermost rows of 4 passageways and into a preheating stage at 150° F. to evacuate any moisture. After passing through the preheating oven, the fiber tows are pulled through a wet out tank. In the wet out tank a device effectually moves the fibers up and down in a vertical direction enabling thorough wetting of the fiber tows. On the upstream side of the wet out tank is located a wiper system that removes excess resin as the fiber tows are pulled from the tank. The excess resin is collected by a resin overflow tray and added back to the resin wet out tank.

The fiber tows are pulled from the wet out tank to a B-state oven that semi-cures the resin impregnated fiber tows to a tack stage. At this stage the fiber tows can be further compacted and configured to their final form in the next phase. The fiber tows are pulled to a next oven at B-stage oven temperature to maintain the tack stage. Within the oven are eight consecutive bushings that function to compact and configure the fiber tows to the final composite core member form. Two fiber tow ends are threaded through each of the 134 passageways in the first bushing which are machined to pre-calculated dimensions to achieve a fiber volume of 72 percent and a resin volume of 28 percent in the final composite core member. The ends of the fiber tows exiting from passageways in the top right quarter comprising half of the two top rows are threaded through passageways 132 of the next bushing; the ends of the fiber tows exiting from passageways in the top left quarter comprising half of the top two rows are threaded through passageway 136 of the next bushing; the ends of the fiber tows exiting from passageways in the lower right quarter comprising half of the bottom two rows are threaded through passageway 140 of the next bushing; the ends of the fiber tows exiting from passageways in the lower left quarter comprising half of the bottom two rows are threaded through passageway 138 of the next bushing; the right and left quarters of passageways in the middle upper row are threaded through passageways 142 and 144 of the next bushing and the right and left quarters of passageways in the middle bottom row are threaded through passageways 134 and 146 respectively.

The fiber tows are pulled consecutively through the outer and inner passageways of each successive bushing further compacting and configuring the fiber bundles. At bushing seven, the fiber bundles pulled through the inner four passageways of bushing six are combined to form a composite core whereas the remaining outer passageways continue to keep the four bundles glass fibers separate. The four outer passageways of bushing seven are moved closer inward in bushing eight, closer to the inner carbon core. The fiber tows are combined with the inner carbon core in bushing nine forming a hybridized composite core member comprising an inner carbon core having an outer glass layer.

The composite core member is pulled from the bushing nine to a final curing oven at an elevated temperature of 380° F. as required by the specific resin. From the curing oven the composite core member is pulled through a cooling oven to be cooled to 150 to 180° F. After cooling the composite core member is pulled through a post curing oven at elevated temperature, preferably to heat the member to at least B-stage temperature. After post-curing the member is cooled by air to approximately 180° F. The member is cooled prior to grabbing by the caterpillar puller to the core winding wheel having 6000 feet of storage.

Example Two

Composite Core

An example of an ACCC reinforced cable in accordance with the present invention follows. An ACCC reinforced cable comprising four layers of components consisting of an inner carbon/epoxy layer, a next glassfiber/epoxy layer and two layers of tetrahedral shaped aluminum strands. The strength member consists of an advanced composite T700S carbon/epoxy having a diameter of about 0.2165 inches, surrounded by an outer layer of R099-688 glassfiber/epoxy having a layer diameter of about 0.375 inches. The glassfiber/ epoxy layer is surrounded by an inner layer of nine trapezoidal shaped aluminum strands having a diameter of about 0.7415 inches and an outer layer of thirteen trapezoidal shaped aluminum strands having a diameter of about 1.1080 inches. The total area of carbon is about 0.037 in$^2$, of glass is about 0.074 in$^2$, of inner aluminum is about 0.315 in$^2$ and outer aluminum is about 0.5226 in$^2$. The fiber to resin ratio in the inner carbon strength member is 70/30 by weight and the outer glass layer fiber to resin ratio is 75/25 by weight.

The specific specifications are summarized in the following table:

| Glass Vetrotex roving R099-686 (900 Yield) |
| --- |
| Tensile Strength, psi 298,103 |
| Elongation at Failure, % 3.0 |
| Tensile Modulus, ×10$^6$ psi 11.2 |
| Glass Content, % 57.2 |
| Carbon (graphite) Carbon: Torayca T700S (Yield 24K) |
| Tensile strength, Ksi 711 |
| Tensile Modulus, Msi 33.4 |
| Strain 2.1% |
| Density lbs/ft$^3$ 0.065 |
| Filament Diameter, in 2.8E−04 |
| Epoxy Matrix System Araldite MY 721 |
| Epoxy value, equ./kg 8.6-9.1 |
| Epoxy Equivalent, g/equ. 109 |
| Viscosity @ 50 C., cPs 3000-6000 |
| Density @ 25 C. lb/gal. 1.1501.18 |
| Hardener 99-023 |
| Viscosity @ 25 C., cPs 75-300 |
| Density @ 25 C., lb/gal 1.19-1/22 |
| Accelerator DY 070 Viscosity @25 C., cPs <50 |
| Density @ 25 C., lb/gal 0.95-1.05 |

An ACCC reinforced cable having the above specifications is manufactured according to the following. The process used to form the composite cable in the present example is illustrated in FIG. 1. First, 126 spools of glass fiber tows 12 and 8 spools of carbon are set up in the rack system 14 and the ends of the individual fiber tows 12, leading from spools 11, are threaded through a fiber tow guide 18. The fibers undergo tangential pulling to prevent twisted fibers. A puller 16 at the end of the apparatus pulls the fibers through the apparatus. Each dispensing rack 14 has a small brake to individually adjust the tension for each spool. The tows 12 are pulled through the guide 18 and into a preheating oven 20 at 150° F. to evacuate moisture.

The tows 12 are pulled into wet out tank 22. Wet out tank 22 is filled with Araldite MY 721/Hardener 99-023/Accelerator DY070 to impregnate the fiber tows 12. Excess resin is removed from the fiber tows 12 during wet out tank 22 exit. The fiber tows 12 are pulled from the wet out tank 22 to a B-stage oven 24 and are heated to 200° F. Fiber tows 12 maintained separated by the guide 18, are pulled into a second B-stage oven 26 also at 200° F. comprising a plurality of consecutive bushings to compress and configure the tows 12. In the second B-stage oven 26, the fiber tows 12 are directed through a plurality of passageways provided by the bushings. The consecutive passageways continually compress and configure the fiber tows 12 into the final uniform composite core member.

The first bushing has two rows of 32 passageways, two inner rows of 31 passageways each and two inner most rows of 4 passageways each. The 126 glass fiber tows are pulled through the outer two rows of 32 and 31 passageways, respectively. The carbon fiber tows are pulled through the inner two rows of 4 passageways eaten. The next bushing splits the top two rows in half and the left portion is pulled through the left upper and outer corner passageway in the second bushing. The right portion is pulled through the right upper and outer corner passageway in the second bushing. The bottom two rows are split in half and the right portion is pulled through the lower right outer corner of the second bushing and the left portion is pulled through the lower left outer corner of the second bushing. Similarly, the two inner rows of carbon are split in half and the fibers of the two right upper passageways are pulled through the inner upper right corner of the second bushing. The fibers of the left upper passageways are pulled through the inner upper left corner of the second bushing. The fibers of the right lower passageways are pulled through the inner lower right corner of the second bushing and the fibers of the left lower passageways are pulled through the inner lower left corner of the second bushing.

The fiber bundles are pulled through a series of seven bushings continually compressing and configuring the bundles into one hybridized uniform concentric core member.

The composite core member is pulled from the second B-stage oven 26 to a next oven processing system 28 at 330 to 370° F. wherein the composite core member is cured and pulled to a next cooling system 30 at 30 to 100° F. for cooling. After cooling, the composite core is pulled to a next oven processing system 32 at 330 to 370° F. for post curing. The pulling mechanism pulls the product through a 10 foot air cooling area at about 180° F.

Nine trapezoidal shaped aluminum strands each having an area of about 0.0350 or about 0.315 sq. in. total area on the core are wrapped around the composite core after cooling. Next, thirteen trapezoidal shaped aluminum strands each strand having an area of about 0.0402 or about 0.5226 sq. in. total area on the core are wrapped around the inner aluminum layer.

It is to be understood that the invention is not limited to the exact details of the construction, operation, exact materials, or embodiments shown and described, as modifications and equivalents will be apparent to one skilled in the art without departing from the scope of the invention.

We claim:

1. A composite core for an electrical cable comprising:
 a plurality of substantially continuous reinforcing carbon fibers embedded in a resin; and
 a non-conductive insulating layer comprising glass fibers, the insulating layer surrounding and insulating the carbon fibers,
 wherein the composite core has a length of at least about 6000 feet and is adapted for use as a strength member in an electrical distribution and transmission cable.

2. A composite core as recited in claim 1, wherein the carbon fibers have a modulus of elasticity of at least about 22 Msi.

3. A composite core as recited in claim 1, wherein the carbon fibers have a tensile strength of at least about 350 Ksi.

4. A composite core as recited in claim 1, wherein the glass fibers have a tensile strength of at least about 250 Ksi.

5. A composite core as recited in claim 4, wherein the glass fibers have a lower modulus of elasticity than the carbon fibers.

6. A composite core as recited in claim 5, wherein the glass fibers comprise substantially continuous glass fibers.

7. A composite core as recited in claim 6, wherein the glass fibers are embedded in the resin.

8. A composite core as recited in claim 1, wherein the composite core has a tensile strength above 160 Ksi.

9. A composite core as recited in claim 1, wherein the composite core has a modulus of elasticity within the range of about 7 Msi to about 30 Msi.

10. A composite core as recited in claim 1, wherein the composite core has a coefficient of thermal expansion in the range of about $0\times10^{-6}$ to about $6\times10^{-6}$ m/m/° C.

11. A composite core as recited in claim 1, wherein the carbon fibers are oriented substantially parallel to the longitudinal axis of the composite core.

12. A composite core as recited in claim 1, wherein the glass fibers comprise substantially continuous glass fibers embedded in the resin.

13. A composite core as recited in claim 12, wherein the substantially continuous glass fibers are oriented substantially parallel to a longitudinal axis of the composite core.

14. A composite core as recited in claim 1, wherein the resin comprises a thermosetting epoxy resin.

15. A composite core as recited in claim 1, wherein the substantially continuous reinforcing carbon fibers comprise a plurality of reinforcing carbon fiber tows.

16. A composite core as recited in claim 15, wherein the plurality of reinforcing carbon fiber tows are compacted to form an inner layer of reinforcing carbon fibers.

17. A composite core as recited in claim 15, wherein the glass fibers comprise a plurality of substantially continuous glass fiber tows.

18. A composite core as recited in claim 17, wherein the composite core is fabricated by pulling the plurality of carbon fiber tows and the plurality of glass fiber tows through a composite core processing system.

19. A composite core as recited in claim 1, wherein the composite core further comprises basalt fibers.

20. A composite core for an electrical cable comprising:
a plurality of substantially continuous reinforcing carbon fibers embedded in a thermosetting epoxy resin; and
a glass layer surrounding and insulating the carbon fibers, where the glass layer comprises a plurality of substantially continuous glass fibers;
wherein the composite core has a tensile strength above 160 Ksi and a modulus of elasticity within the range of about 7 Msi to about 30 Msi, and is adapted for use as a strength member in an electrical distribution and transmission cable.

21. A composite core as recited in claim 20, wherein the glass fibers have a lower modulus of elasticity than the carbon fibers.

22. An electrical transmission and distribution cable, comprising:
a single composite core strength member, the strength member comprising a plurality of substantially continuous reinforcing carbon fibers embedded in a resin and a non-conductive insulating layer comprising glass fibers surrounding the carbon fibers; and
at least one layer of conductor surrounding the composite core strength member,
wherein the insulating layer is disposed between the carbon fibers and the at least one layer of conductor and is substantially concentric with the at least one layer of conductor to insulate the carbon fibers from the conductor.

23. An electrical cable as recited in claim 22, wherein the at least one layer of conductor comprises a plurality of aluminum conductor strands that are helically wrapped around the composite core strength member.

24. An electrical cable as recited in claim 23, wherein the aluminum conductor strands are trapezoidal shaped.

25. An electrical cable as recited in claim 22, wherein the glass fibers have a tensile strength of at least about 250 Ksi.

26. An electrical cable as recited in claim 25, wherein the glass fibers have a lower modulus of elasticity than the carbon fibers.

27. An electrical cable as recited in claim 26, wherein the glass fibers comprise substantially continuous glass fibers.

28. An electrical cable as recited in claim 27, wherein the glass fibers are embedded in the resin.

29. An electrical cable as recited in claim 22, wherein the composite core has a tensile strength above 160 Ksi.

30. An electrical cable as recited in claim 29, wherein the composite core has a modulus of elasticity within the range of about 7 Msi to about 30 Msi.

31. An electrical cable as recited in claim 30, wherein the composite core has a coefficient of thermal expansion in the range of about $0\times10^{-6}$ to about $6\times10^{-6}$ m/m/° C.

32. An electrical cable as recited in claim 22, wherein the carbon fibers are oriented substantially parallel to the longitudinal axis of the composite core.

33. An electrical cable as recited in claim 22, wherein the glass fibers comprise substantially continuous glass fibers embedded in the resin matrix.

34. An electrical cable as recited in claim 33, wherein the substantially continuous glass fibers are oriented substantially parallel to the longitudinal axis of the composite core.

35. An electrical cable as recited in claim 33, wherein the resin comprises a thermosetting epoxy resin.

36. An electrical cable as recited in claim 22, wherein the substantially continuous reinforcing carbon fibers comprise a plurality of reinforcing carbon fiber tows.

37. An electrical cable as recited in claim 36, wherein the plurality of reinforcing carbon fiber tows are compacted to form an inner layer of reinforcing carbon fibers.

38. An electrical cable as recited in claim 37, wherein the glass fibers comprise a plurality of substantially continuous glass fiber tows.

39. An electrical cable as recited in claim 38, wherein the composite core is fabricated by pulling the plurality of carbon fiber tows and the plurality of glass fiber tows through a composite core processing system.

40. An electrical cable as recited in claim 39, wherein the composite core has a length of at least about 6000 feet.

41. An electrical transmission and distribution cable, comprising:
a single composite core strength member, the strength member comprising a plurality of substantially continuous reinforcing carbon fibers embedded in a resin and an insulating glass layer surrounding the carbon fibers; and
at least one layer of aluminum conductor strands surrounding the composite core strength member,
wherein the composite core strength member has a tensile strength above 160 Ksi and a modulus of elasticity within the range of about 7 Msi to about 30 Msi, and wherein the glass layer is nonconductive and provides an insulating layer between the carbon fibers and the aluminum conductor strands.

42. An electrical cable as recited in claim 41, wherein the electrical cable comprises a single composite core strength member.

43. An electrical cable as recited in claim 41, wherein the electrical cable has a length of at least about 6000 feet.

* * * * *